US011129224B2

(12) United States Patent
Abedini et al.

(10) Patent No.: US 11,129,224 B2
(45) Date of Patent: Sep. 21, 2021

(54) INTEGRATED ACCESS BACKHAUL LINK MANAGEMENT DURING LOSS OF UPLINK SYNCHRONIZATION

(71) Applicant: QUALCOMM Incorporated, San Diego, CA (US)

(72) Inventors: Navid Abedini, Somerset, NJ (US); Muhammad Nazmul Islam, Littleton, MA (US); Jianghong Luo, Skillman, NJ (US); Karl Georg Hampel, Hoboken, NJ (US); Junyi Li, Chester, NJ (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 16/562,320

(22) Filed: Sep. 5, 2019

(65) Prior Publication Data

US 2020/0084819 A1 Mar. 12, 2020

Related U.S. Application Data

(60) Provisional application No. 62/729,895, filed on Sep. 11, 2018.

(51) Int. Cl.
*H04W 76/18* (2018.01)
*H04B 7/14* (2006.01)
(Continued)

(52) U.S. Cl.
CPC .............. *H04W 76/18* (2018.02); *H04B 7/14* (2013.01); *H04L 41/0813* (2013.01);
(Continued)

(58) Field of Classification Search
CPC . H04W 76/18; H04W 76/38; H04W 72/1284; H04W 76/15; H04W 76/19;
(Continued)

(56) References Cited

U.S. PATENT DOCUMENTS

2010/0111036 A1* 5/2010 Iwamura ............... H04W 36/02
370/331
2011/0242970 A1 10/2011 Prakash et al.
(Continued)

OTHER PUBLICATIONS

International Search Report and Written Opinion—PCT/US2019/049998—ISA/EPO—dated Nov. 26, 2019.
(Continued)

*Primary Examiner* — Charles C Jiang
*Assistant Examiner* — Shawn D Miller
(74) *Attorney, Agent, or Firm* — Holland & Hart LLP

(57) ABSTRACT

A relay node supporting mobile terminal (MT) functionality and distributed unit (DU) functionality may receive a timing advance (TA) value for uplink synchronization associated with a timing alignment timer from a parent node. In some cases, the timing alignment timer may expire prior to the relay node receiving a next TA value. Upon expiration of the timing alignment timer, the relay node may initiate a second timer (e.g., a transition timer) associated with the transitioning of a DU entity of the relay node to a DU transition state. The DU transition state is associated with certain DU behavior for serving child nodes while the transition timer is active. Configuration of the DU transition state may be identified by the relay node, or received from a parent node. In cases where the transition timer expires prior to receiving a next TA value, the DU may declare a loss of uplink synchronization.

30 Claims, 14 Drawing Sheets

(51) Int. Cl.
*H04L 12/24* (2006.01)
*H04W 76/38* (2018.01)
*H04W 72/12* (2009.01)
*H04W 76/15* (2018.01)

(52) U.S. Cl.
CPC ....... *H04W 72/1284* (2013.01); *H04W 76/15* (2018.02); *H04W 76/38* (2018.02)

(58) Field of Classification Search
CPC .... H04W 76/27; H04W 56/0045; H04B 7/14; H04B 7/15528; H04L 41/0813
See application file for complete search history.

(56) References Cited

U.S. PATENT DOCUMENTS

| | | | | |
|---|---|---|---|---|
| 2011/0243102 A1* | 10/2011 | Sebire | ............... | H04W 56/0005 370/336 |
| 2012/0282932 A1* | 11/2012 | Yu | ...................... | H04W 84/005 455/437 |
| 2014/0079022 A1* | 3/2014 | Wang | .................... | H04W 36/22 370/331 |
| 2015/0334611 A1* | 11/2015 | Kim | .................. | H04W 36/0083 370/331 |
| 2016/0192255 A1* | 6/2016 | Tsuda | .................... | H04W 88/00 370/331 |

OTHER PUBLICATIONS

Potevio: "Behavior Associate to RLF on Un," 3GPP TSG-RAN WG2 #69bis, 3GPP Draft; R2-102006, 3rd Generation Partnership Project (3GPP), Mobile Competence Centre 650, Route Des Lucioles; F-06921 Sophia-Antipolis Cedex; France, vol. RAN WG2, No. Beijing, China; Apr. 12, 2010, Apr. 4, 2010 (Apr. 4, 2010), pp. 1-3, XP050422361, [retrieved on Apr. 4, 2010].

\* cited by examiner

INTEGRATED ACCESS BACKHAUL LINK MANAGEMENT DURING LOSS OF UPLINK SYNCHRONIZATION

CROSS REFERENCE

The present application for patent claims the benefit of U.S. Provisional Patent Application No. 62/729,895 by ABEDINI, et al., entitled "INTEGRATED ACCESS BACKHAUL LINK MANAGEMENT DURING LOSS OF UPLINK SYNCHRONIZATION," filed Sep. 11, 2018, assigned to the assignee hereof, and expressly incorporated by reference herein.

BACKGROUND

The present disclosure relates generally to wireless communications, and more specifically to integrated access backhaul (IAB) link management during loss of uplink synchronization.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., 5G NR systems), infrastructure and spectral resources for NR access may additionally support wireless backhaul link capabilities in supplement to wireline backhaul connections, providing an IAB network architecture. One or more base stations may include centralized units (CUs) and distributed units (DUs), and may be referred to as donor base stations. One or more DUs associated with a donor base station may be partially controlled by one or more CUs associated with the donor base station. The one or more donor base stations (e.g., IAB donors) may be in communication with one or more additional base stations (e.g., IAB nodes) via supported access and backhaul links. IAB nodes may support mobile terminal (MT) functionality controlled and/or scheduled by one or more DUs of a coupled IAB donor, as well as one or more DUs relative to additional entities (e.g., IAB nodes, UEs, etc.) within the relay chain or configuration of the access network (e.g., downstream).

Due to propagation delays associated with data transmission across network resources, intermediary devices (e.g., IAB nodes) and/or terminal devices (e.g., UEs) within the relay chain may attempt to compensate for delays in uplink transmission scheduling on a communication link. Compensation (e.g., uplink delay compensation) may be based on an estimated timing advance (TA) provided by an antecedent (e.g., parent) device, such as an IAB donor or parent IAB node relative to the intermediary or terminal devices. Some wireless communications systems may employ such compensation techniques to support the alignment of uplink transmissions with subframe timing at the network. A TA value may be dynamically implemented according to a configured timer (e.g., timeAlignmentTimer), where the IAB node or the UE may then be considered uplink time aligned. However, in some cases, a timer may expire without renewal of a TA value and an IAB node or a UE may consider the timer expiration as an indication of a loss of uplink synchronization. Improved techniques for handling such a loss of uplink synchronization in IAB networks may be desired.

SUMMARY

The described techniques relate to improved methods, systems, devices, or apparatuses that support a mobile terminal (MT) timing alignment timer and a distributed unit (DU) transition state in a wireless communication network (e.g., in an integrated access backhaul (IAB) network). Generally, the described techniques provide for enhanced service resolution mechanisms to address expiration of a timing alignment timer associated with one or more communication links (e.g., access links, wireless links, or wired backhaul links) of the network. The network may include one or more connected base stations and UEs supporting multiple communication links within a relay chain. A core network may be associated with one or more access networks (ANs). In networks employing distributed node techniques, each AN may include a centralized unit (CU) (e.g., associated with a donor base station) and one or more nodes (e.g., DUs, for example, also associated with the donor base station) for scheduling communications with MTs (e.g., associated with intermediary base stations or UEs of the network). In some cases, an intermediary base station (e.g., a relay node) may thus include a DU for communications with child nodes (e.g., nodes or base stations further down the relay chain) and an MT for communications with parent nodes (e.g., nodes or base stations higher up the relay chain).

A relay node (e.g., the DU of a relay node) may identify that a timing alignment timer for a communication link with a parent node (e.g., a communication link between an MT of the relay node and the parent node) has expired. In some cases, the relay node may identify a loss of uplink synchronization (e.g., with the parent node) based on the absence of any received timing advance (TA) commands prior to the expiration of the timing alignment timer. In response to the expiration of the timing alignment timer, the relay node may set a transition timer for communication links with child nodes (e.g., for communication links between a DU of the relay node and one or more child nodes). In some cases, expiration of the transition timer may indicate that the DU of the relay node has lost timing synchronization with at least one of the child nodes (e.g., the relay node may identify a radio link failure (RLF) based on the expiration of the transition timer).

The DU of the relay node may be operated in a transition state while the transition timer is active. In some cases, the DU of the relay node may become inactive in the transition state, may resume normal operation in the transition state, or may become semi-active and offer a reduced set of services in the transition state. For example, during the transition state, the DU may perform all or none of operations such as buffering downlink transmissions to child nodes, flushing downlink buffers, scheduling child node uplink transmissions, processing uplink transmissions from child nodes, buffering uplink transmissions to parent nodes, transmitting acknowledgments in response to previously received downlink transmissions, signaling broadcast transmissions or reference signals, etc.

In some cases, the configuration of the transition state (e.g., the duration of the transition timer, the operations performable by the DU in the transition state, etc.) may be preconfigured by the network (e.g., via radio resource control (RRC) signaling, through relay node software, etc.). Additionally or alternatively, the configuration of the transition state may be received from a parent node of the relay node (e.g., via a media access control (MAC) control element (CE), RRC signaling, master information block (MIB), system information block (SIB), remaining minimum system information (RMSI), other system information (OSI), etc.) and/or may be received from a central entity of the network, such as the IAB-donor's CU (e.g., via RRC signaling, upper layer signaling over an F1-application protocol (AP) interface, etc.).

In some cases, the configuration of the transition state may be based on the current state of the relay node, such as the topological state of the relay node (e.g., the hop count, number of connections, or chain location of the relay node), the mobility state of the relay node (e.g., whether the relay node is fixed, low-speed mobility, high-speed mobility), the scheduling state of the relay node (e.g., any pre-scheduled or upcoming communications associated with the relay node), etc. For example, the relay node may send information relating to (e.g., or indicative of) the current state of the relay node to a parent node and/or a central entity of the network, and the parent node and/or central entity may configure the transition state of the relay node based on the current state information of the relay node.

Further, in some examples, the relay node may transmit an indication of the transition state operation to one or more child nodes. For example, the relay node may inform child nodes that the DU of the relay node is operating according to the transition state (e.g., responsive to a timing alignment timer having expired for uplink synchronization). In such cases, child nodes may modify the communications with the relay node according to transition state information (e.g., child nodes may modify configuration communication links with the relay node based on the received indication of transition state information). For example, in some cases, child nodes may search for a new serving cell in response to the received indication (e.g., and may cease communication with the relay node). In other examples, the child nodes may cancel uplink communications with the relay node, cancel downlink communications with a fourth node (e.g., a child of the child node, or a grandchild of the relay node), flush downlink buffers, buffer uplink transmissions, etc. based on transition state information indicated by the relay node.

A method of wireless communication at a relay node of a wireless communications network is described. The method may include identifying that a timing alignment timer for a first communication link between a parent node of the wireless communications network and the relay node has expired and setting, responsive to identifying that the timing alignment timer has expired, a transition timer for a second communication link between the relay node and at least one child node of the wireless communications network. The expiration of the transition timer may indicate that the relay has lost timing synchronization with the at least one child node on the second communication link. The method may further include operating the relay node in a transition state while the transition timer is active.

An apparatus for wireless communication at a relay node of a wireless communications network is described. The apparatus may include a processor, memory coupled with the processor, and instructions stored in the memory. The instructions may be executable by the processor to cause the apparatus to identify that a timing alignment timer for a first communication link between a parent node of the wireless communications network and the relay node has expired, and set, responsive to identifying that the timing alignment timer has expired, a transition timer for a second communication link between the relay node and at least one child node of the wireless communications network, where an expiration of the transition timer indicates that the relay has lost timing synchronization with the at least one child node on the second communication link. The instructions may be executable by the processor to further cause the apparatus to operate the relay node in a transition state while the transition timer is active.

Another apparatus for wireless communication at a relay node of a wireless communications network is described. The apparatus may include means for identifying that a timing alignment timer for a first communication link between a parent node of the wireless communications network and the relay node has expired, and setting, responsive to identifying that the timing alignment timer has expired, a transition timer for a second communication link between the relay node and at least one child node of the wireless communications network, where an expiration of the transition timer indicates that the relay has lost timing synchronization with the at least one child node on the second communication link. The apparatus may further include means for operating the relay node in a transition state while the transition timer is active.

A non-transitory computer-readable medium storing code for wireless communication at a relay node of a wireless communications network is described. The code may include instructions executable by a processor to identify that a timing alignment timer for a first communication link between a parent node of the wireless communications network and the relay node has expired, and set, responsive to identifying that the timing alignment timer has expired, a transition timer for a second communication link between the relay node and at least one child node of the wireless communications network, where an expiration of the transition timer indicates that the relay has lost timing synchronization with the at least one child node on the second communication link. The code may include instructions further executable by a processor to operate the relay node in a transition state while the transition timer is active.

In some examples of the method, apparatuses, and non-transitory computer-readable medium described herein, operating the relay node in the transition state while the transition timer is active may include operations, features, means, or instructions for refraining from communicating with the at least one child node using the second communication link when the transition timer is active. In some examples of the method, apparatuses, and non-transitory computer-readable medium described herein, operating the relay node in the transition state while the transition timer is active may include operations, features, means, or instructions for continuing to communicate with the at least one child node using the second communication link when the transition timer is active.

In some examples of the method, apparatuses, and non-transitory computer-readable medium described herein, operating the relay node in the transition state while the transition timer is active may include operations, features, means, or instructions for continuing to communicate with the at least one child node using the second communication link according to a reduced communication level while the transition timer is active, the reduced communication level reduced from a first communication level of the relay node before identifying that the timing alignment timer may have expired.

In some examples of the method, apparatuses, and non-transitory computer-readable medium described herein, continuing to communicate with the at least one child node according to the reduced communication level may include operations, features, means, or instructions for transmitting downlink traffic buffered at the relay node to the at least one child node of the wireless communications network.

In some examples of the method, apparatuses, and non-transitory computer-readable medium described herein, continuing to communicate with the at least one child node according to the reduced communication level may include operations, features, means, or instructions for refraining from transmitting downlink traffic buffered at the relay node to the at least one child node of the wireless communications network and flushing at least one buffer for the downlink traffic for the at least one child node of the wireless communications network.

In some examples of the method, apparatuses, and non-transitory computer-readable medium described herein, continuing to communicate with the at least one child node according to the reduced communication level may include operations, features, means, or instructions for refraining from transmitting downlink traffic buffered at the relay node to the at least one child node of the wireless communications network and maintaining the downlink traffic buffered for the at least one child node of the wireless communications network. In some examples of the method, apparatuses, and non-transitory computer-readable medium described herein, continuing to communicate with the at least one child node according to the reduced communication level may include operations, features, means, or instructions for refraining from receiving scheduled uplink transmissions from the at least one child node of the wireless communications network.

In some examples of the method, apparatuses, and non-transitory computer-readable medium described herein, continuing to communicate with the at least one child node according to the reduced communication level may include operations, features, means, or instructions for receiving scheduled uplink transmissions from the at least one child node of the wireless communications network, buffering the received scheduled uplink transmissions and transmitting one or more acknowledgements to the at least one child node of the wireless communications network based on the received scheduled uplink transmissions.

In some examples of the method, apparatuses, and non-transitory computer-readable medium described herein, continuing to communicate with the at least one child node according to the reduced communication level may include operations, features, means, or instructions for refraining from scheduling uplink transmissions for the at least one child node of the wireless communications network. In some examples of the method, apparatuses, and non-transitory computer-readable medium described herein, continuing to communicate with the at least one child node according to the reduced communication level may include operations, features, means, or instructions for transmitting a broadcast signal, a reference signal, or a combination thereof.

Some examples of the method, apparatuses, and non-transitory computer-readable medium described herein may further include operations, features, means, or instructions for transmitting, to the child node, an indication that the relay node may be operating according to a transition state responsive to a timing alignment timer having expired for a first communication link between the relay node and a parent node of the relay node and modifying a configuration of a second communication link between the child node and the relay node based on the timing alignment timer having expired.

Some examples of the method, apparatuses, and non-transitory computer-readable medium described herein may further include operations, features, means, or instructions for identifying an RLF based on the expiration of the transition timer. Some examples of the method, apparatuses, and non-transitory computer-readable medium described herein may further include operations, features, means, or instructions for identifying a configuration for the transition timer of the relay node based on the expiration of the timing alignment timer.

Some examples of the method, apparatuses, and non-transitory computer-readable medium described herein may further include operations, features, means, or instructions for receiving the configuration for the transition timer of the relay node from the parent node of the wireless communications network, a CU of a third node of the wireless communications network, or both. Some examples of the method, apparatuses, and non-transitory computer-readable medium described herein may further include operations, features, means, or instructions for transmitting an indication of a current state of the node to the parent node of the wireless communications network, the CU of the third node of the wireless communications network, or both, where the configuration for the transition timer of the relay node may be based on the current state.

In some examples of the method, apparatuses, and non-transitory computer-readable medium described herein, the configuration for the transition timer of the relay node may be based on a topology state of the relay node, a mobility state of the relay node, a scheduling state of the relay node, a configuration of a MT of the relay node, or some combination thereof. In some examples of the method, apparatuses, and non-transitory computer-readable medium described herein, the configuration for the transition timer may be based on the timing alignment timer, a random access channel (RACH) configuration of the MT, or a combination thereof.

Some examples of the method, apparatuses, and non-transitory computer-readable medium described herein may further include operations, features, means, or instructions for buffering a downlink transmission, flushing a downlink buffer, scheduling an uplink transmission, processing the uplink transmission, buffering an uplink transmission, transmitting an acknowledgment in response to the downlink transmission, signaling a broadcast transmission, signaling a reference signal, or a combination thereof.

Some examples of the method, apparatuses, and non-transitory computer-readable medium described herein may further include operations, features, means, or instructions for transmitting, to a third node of the wireless communications network, an indication that the relay node may have lost uplink synchronization for the communication link between the relay node and the parent node of the wireless communications network, an indication that for the third node of the wireless communications network to find another serving cell, and indication of services provided by the relay node in the transition state, or some combination thereof.

Some examples of the method, apparatuses, and non-transitory computer-readable medium described herein may further include operations, features, means, or instructions for identifying whether a timing alignment timer for a third communication link between a second parent node of the wireless communications network and the relay node may be active or may have expired, where setting the transition timer for the second communication link may be based on the timing alignment timer for the first communication link having expired regardless of whether the timing alignment timer for the third communication link may be active or may have expired. In some examples of the method, apparatuses, and non-transitory computer-readable medium described herein, the second parent node includes a second node of the wireless communications network and the parent node includes a primary node of the wireless communications network.

Some examples of the method, apparatuses, and non-transitory computer-readable medium described herein may further include operations, features, means, or instructions for identifying that a timing alignment timer for a third communication link between a second parent node of the wireless communications network and the relay node may have expired, where setting the transition timer for the second communication link may be based on the timing alignment timer for the first communication link having expired and the timing alignment timer for the third communication link having expired.

Some examples of the method, apparatuses, and non-transitory computer-readable medium described herein may further include operations, features, means, or instructions for identifying that all of a set of timing alignment timers for wireless communication links between the relay node and a set of parent nodes may have expired, where the parent node may be one of the set of parent nodes, and where setting the transition timer for the second communication link may be based on identifying that all of the set of timing alignment timers may have expired.

Some examples of the method, apparatuses, and non-transitory computer-readable medium described herein may further include operations, features, means, or instructions for identifying that at least one of a set of timing alignment timers for wireless communication links between the relay node and a set of parent nodes may have expired, where the parent node may be one of the set of parent nodes, and where setting the transition timer for the second communication link may be based on identifying that the at least one of the set of timing alignment timers may have expired. In some examples of the method, apparatuses, and non-transitory computer-readable medium described herein, setting the transition time for the second communication link may include operations, features, means, or instructions for setting, responsive to identifying that the timing alignment timer may have expired, a set of transition timers for the second communication link between the relay node and the at least one child node.

A method of wireless communication at a child node of a wireless communications network is described. The method may include receiving, from a relay node of the wireless communications network, an indication that the relay node is operating according to a transition state responsive to a timing alignment timer having expired for a first communication link between the relay node and a parent node of the relay node and modifying a configuration of a second communication link between the child node and the relay node based on the received indication.

An apparatus for wireless communication at a child node of a wireless communications network is described. The apparatus may include a processor, memory coupled with the processor, and instructions stored in the memory. The instructions may be executable by the processor to cause the apparatus to receive, from a relay node of the wireless communications network, an indication that the relay node is operating according to a transition state responsive to a timing alignment timer having expired for a first communication link between the relay node and a parent node of the relay node and modify a configuration of a second communication link between the child node and the relay node based on the received indication.

Another apparatus for wireless communication at a child node of a wireless communications network is described. The apparatus may include means for receiving, from a relay node of the wireless communications network, an indication that the relay node is operating according to a transition state responsive to a timing alignment timer having expired for a first communication link between the relay node and a parent node of the relay node and modifying a configuration of a second communication link between the child node and the relay node based on the received indication.

A non-transitory computer-readable medium storing code for wireless communication at a child node of a wireless communications network is described. The code may include instructions executable by a processor to receive, from a relay node of the wireless communications network, an indication that the relay node is operating according to a transition state responsive to a timing alignment timer having expired for a first communication link between the relay node and a parent node of the relay node and modify a configuration of a second communication link between the child node and the relay node based on the received indication.

In some examples of the method, apparatuses, and non-transitory computer-readable medium described herein, modifying the configuration of the second communication link may include operations, features, means, or instructions for searching for a new serving cell in response to the received indication and ceasing to communicate with the relay node. In some examples of the method, apparatuses, and non-transitory computer-readable medium described herein, modifying the configuration of the second communication link may include operations, features, means, or instructions for canceling an uplink communication with the relay node, a downlink communication with the relay node, an uplink communication with a fourth node of the wireless network that may be a child to the child node, a downlink communication with the fourth node, or a combination thereof.

In some examples of the method, apparatuses, and non-transitory computer-readable medium described herein, modifying the configuration of the second communication link may include operations, features, means, or instructions for receiving a downlink transmission, flushing an uplink buffer, processing an uplink transmission, buffering an uplink transmission, transmitting an acknowledgment in response to the downlink transmission, processing a broadcast transmission, signaling a reference signal, or a combination thereof. In some examples of the method, apparatuses, and non-transitory computer-readable medium described herein, receiving the indication may include operations, features, means, or instructions for receiving the indication in a MIB, a SIB, a RMSI signal, an OSI signal, a MAC-CE, RRC signaling, an upper-layer signaling, or a combination thereof.

A method of wireless communication at a control node of a wireless communications network is described. The method may include identifying a state of a relay node of the wireless communications network, where a parent node communicates with the relay node using a first communication link. The method may further include determining a configuration for a transition timer of the relay node based on the identified state of the relay node, where the transition timer is for a second communication link between the relay node and at least one child node of the relay node, and the transition timer is set by the relay node responsive to an identification that a timing alignment timer for the first communication link has expired. The method may further include transmitting, to the relay node, an indication of the determined configuration for the transition timer of the relay node.

An apparatus for wireless communication at a control node of a wireless communications network is described. The apparatus may include a processor, memory coupled with the processor, and instructions stored in the memory. The instructions may be executable by the processor to cause the apparatus to identify a state of a relay node of the wireless communications network, where a parent node communicates with the relay node using a first communication link, and determine a configuration for a transition timer of the relay node based on the identified state of the relay node, where the transition timer is for a second communication link between the relay node and at least one child node of the relay node, and the transition timer is set by the relay node responsive to an identification that a timing alignment timer for the first communication link has expired. The instructions may be executable by the processor to further cause the apparatus to transmit, to the relay node, an indication of the determined configuration for the transition timer of the relay node.

Another apparatus for wireless communication at a control node of a wireless communications network is described. The apparatus may include means for identifying a state of a relay node of the wireless communications network, where a parent node communicates with the relay node using a first communication link, determining a configuration for a transition timer of the relay node based on the identified state of the relay node, where the transition timer is for a second communication link between the relay node and at least one child node of the relay node, and the transition timer is set by the relay node responsive to an identification that a timing alignment timer for the first communication link has expired, and transmitting, to the relay node, an indication of the determined configuration for the transition timer of the relay node.

A non-transitory computer-readable medium storing code for wireless communication at a control node of a wireless communications network is described. The code may include instructions executable by a processor to identify a state of a relay node of the wireless communications network, where a parent node communicates with the relay node using a first communication link, determine a configuration for a transition timer of the relay node based on the identified state of the relay node, where the transition timer is for a second communication link between the relay node and at least one child node of the relay node, and the transition timer is set by the relay node responsive to an identification that a timing alignment timer for the first communication link has expired, and transmit, to the relay node, an indication of the determined configuration for the transition timer of the relay node.

In some examples of the method, apparatuses, and non-transitory computer-readable medium described herein, the control node includes the parent node of the relay node, a fourth node of the wireless communication network, a central entity, or a combination thereof. In some examples of the method, apparatuses, and non-transitory computer-readable medium described herein, the state of the relay node includes a topological state, a mobility state, a scheduling state, or a combination thereof.

In some examples of the method, apparatuses, and non-transitory computer-readable medium described herein, transmitting the indication of the determined configuration may include operations, features, means, or instructions for identifying, by the control node, that the timing alignment timer for the first communication link may have expired and transmitting the indication of the determined configuration based on the identification that by the control node that the timing alignment timer may have expired.

In some examples of the method, apparatuses, and non-transitory computer-readable medium described herein, transmitting the indication of the determined configuration may include operations, features, means, or instructions for transmitting the indication of the determined configuration in a MAC-CE, RRC signaling, a MIB, a SIB, a RMSI signal, an OSI signal, an upper-layer signaling, or a combination thereof. In some examples of the method, apparatuses, and non-transitory computer-readable medium described herein, transmitting the indication of the determined configuration may include operations, features, means, or instructions for transmitting the indication of the determined configuration over a F1-AP interface.

DETAILED DESCRIPTION

Figure 1:
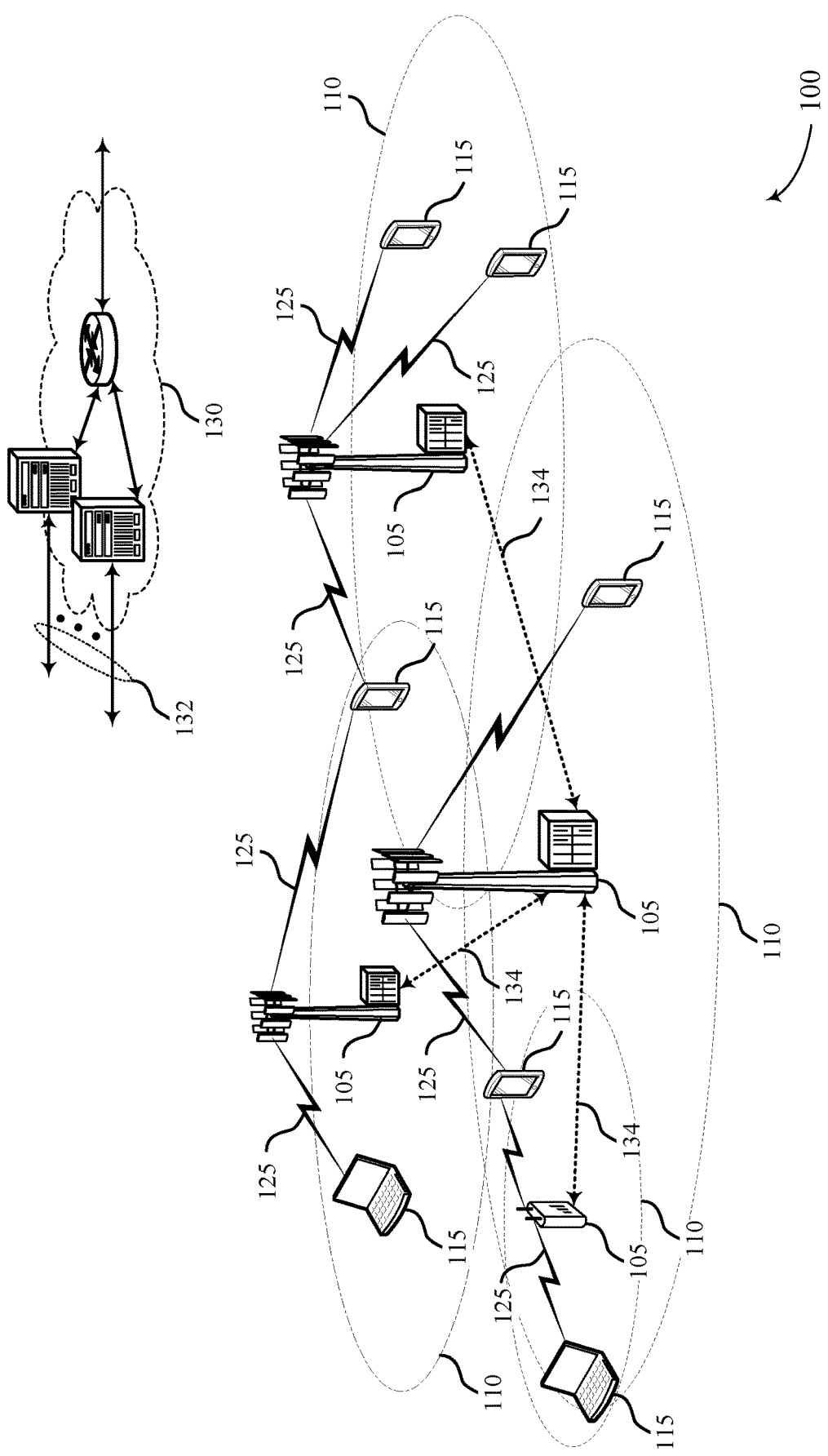
FIG. 1 illustrates an example of a system for wireless communications that supports integrated access backhaul (IAB) link management during loss of uplink synchronization in accordance with aspects of the present disclosure.

In some wireless communications systems (e.g., 5G new radio (NR) systems), infrastructure and spectral resources for NR access may additionally support wireless backhaul link capabilities in supplement to wireline backhaul connections, providing an integrated access backhaul (IAB) network architecture. One or more base stations may include a centralized unit (CU) and a distributed unit (DU), and may be referred to as donor base stations (e.g., or IAB donors). One or more DUs associated with a donor base station may be partially controlled by one or more CUs associated with the donor base station. A base station CU may be a component of a database, data center, core network, or network cloud. A network node associated with a radio access technology (RAT) may communicate with a donor base station CU via a backhaul link (e.g., wireline backhaul or wireless backhaul). The one or more donor base stations (e.g., IAB donors) may be in communication with one or more additional base stations (e.g., IAB nodes or relay nodes) and user equipment (UEs). IAB nodes may support mobile terminal (MT) functionality controlled and scheduled by an IAB donor and/or parent IAB nodes relative to the MT supported IAB nodes, as well as DU operability relative to additional entities (e.g., IAB nodes, UEs, etc.) within the relay chain or configuration of the access network (e.g., downstream). For example, an IAB network architecture may include a chain of connected wireless devices (e.g., starting with a donor base station and ending with a user equipment (UE), with any number of IAB relay nodes in between) via link resources that support NR access and backhaul capabilities (e.g., a wireline backhaul or wireless backhaul).

A relay node may refer to an intermediary node in a relay chain (e.g., an IAB relay) chain. For example, a relay node may relay communications between a parent node (e.g., an IAB donor, or an IAB node upstream or higher on the relay chain) and a child node (e.g., an IAB node downstream or lower on the relay chain). In some cases, the relay node may refer to the DU or access node function (AN-F) of an intermediary IAB node. A child node may refer to an IAB-Node (e.g., the CU/MT of the IAB-Node), or a child node may refer to a UE that is the child of another IAB-Node (e.g., such as the relay node) or an IAB-donor (e.g., the DU/ANF of the IAB-Node or IAB-Donor). A parent node in communication with the relay node may refer to an upstream IAB-Node or an IAB-donor (e.g., the DU/ANF of the IAB-Node or IAB-Donor). In some cases, a parent node may be referred to as a control node (e.g., a control node may refer to a parent node or a DU of a parent node in communication with an MT of a relay node or other intermediary IAB node).

The IAB network architecture may support increased backhaul density within the relay chain, to compensate for mobile capacity density within the one or more service cells corresponding to base stations (e.g., IAB donors, IAB nodes) supported on the network. For example, several IAB nodes may each be in communication with one or more UEs, and the IAB nodes may be controlled and scheduled by one or more DUs via backhaul links. In some cases, a single backhaul connection may support multiple RATs and may aid in improving spectral gains.

For each intermediary or terminal device within the relay chain or configuration of the access network (e.g., IAB nodes or relay nodes and/or UEs downstream from IAB donors directly interfacing with the network), uplink service capabilities at the devices may support mechanisms for promoting alignment of uplink transmissions with subframe timing at the network. For example, a child node (e.g., a downstream or down chain node) may transmit to a parent node (e.g., an antecedent node or upstream node) using a timing configuration configured for a wireless communication link. In some cases, the timing configuration may include an uplink timing advance (TA) value to be employed by the transmitting device (e.g., the child node may employ a TA value for transmissions to a parent node). Accordingly, a parent node may report an estimated TA value and associated timing configuration to the child node (e.g., for parent node scheduling for uplink signaling by a child node, for child node scheduling of uplink signaling based on the estimated TA value and associated timing configuration, etc.).

The TA value may correspond to a negative offset in uplink transmission scheduling to compensate for propagation delay between downlink data reception and uplink transmission (e.g., round trip timing (RTT)) on resources of the communication link. A transmitting device may implement the TA value such that uplink communication on the communication link may be considered uplink time aligned. As such, a relay node (e.g., in an IAB network) may attempt to compensate for data signaling propagation delays via uplink transmission scheduling. Compensation (e.g., uplink delay compensation) may be based on an estimated TA provided by a parent node relative to the relay node, and may support uplink transmission alignment with subframe timing at the network. In some cases, TA values may change over time due to, for example, mobility of the relay node, changing channel conditions, etc. As such, a parent node may transmit updated TA values (e.g., according to relay node mobility, changes in channel conditions, etc.). In some cases, a timer (e.g., a timing alignment timer) may be associated with a TA value and/or may be reset by a transmitting device each time an updated TA value is received.

Additionally or alternatively, due to increased spectral capabilities associated with NR technology and resource deployments, devices of an IAB network may support carrier aggregation (CA) with multiple component carriers (CCs) spanning non-collocated cell coverage areas. In some cases, disparate cell deployments may include different propagation delays associated with data communication and therefore may require different uplink TAs. As such, one or more serving cells with the same estimated uplink TA and downlink timing reference cell may correspond to a timing advance group (TAG). TA values for each TAG may by dynamically implemented according to a configured timing alignment timer (e.g., timeAlignmentTimer) where the relay nodes or terminal devices (e.g., UEs or IAB nodes, including a UE function (UE-F) of an IAB node or a MT of an IAB node) supporting communication links of the serving cells may be considered uplink time aligned.

However, in some cases, a timer may expire prior to a renewal indication by a parent node. A device (e.g., a relay node) may consider the timer expiration an indication of a loss of uplink synchronization. In some systems, a relay node (e.g., a UE-F supported device) may flush all Hybrid Automatic Repeat-Request (HARM) buffers, notify release of configured Physical Uplink Control Channel (PUCCH) and/or Sounding Reference Signal (SRS) mechanisms, clear configured uplink grants, etc. based on the considered loss of uplink synchronization. In consequence, the device may suspend data transmission and reception over the communication link, resulting in undesired service interruption. Further, for a relay node including a DU for command and/or scheduling of supported descendent (e.g., downstream or child) entities relative to the relay node, suspension of data transmission according to a configured timer expiration may propagate service interruptions throughout the relay chain. For example, flushing all buffers and stopping communications with child nodes may result in undesired service interruption.

The techniques described herein provide for enhanced service resolution mechanisms at relay nodes of a network. Generally, the described techniques provide for a DU transition state upon expiration of a timing alignment parameter (e.g., associated with an MT of the relay node). In some examples, a MT of a relay node may identify that a configured timing alignment timer for serving cells of a TAG has expired (e.g., and that uplink synchronization may be lost). Upon the expiration of the timing alignment timer, the relay node (e.g., a DU entity of the relay node) may enter a DU transition state. For example, the relay node (e.g., a DU entity of the relay node) may communicate with one or more child nodes according to the DU transition state.

A DU transition state may refer to certain behavior of, or operations performable by, a relay node (or DU entity of the relay node) after expiration of the timing alignment timer for a wireless link between the relay node (e.g., a MT or UEF of the relay node) and a parent node (e.g., the DU of the parent node). For example, in some cases, a relay node or DU entity of a relay node may become inactive in the DU transition state, may continue normal operation in the DU transition state, may become semi-active with a reduced set of offered services in the DU transition state, etc. In some cases, the DU transition state may be associated with a transition state timer (e.g., a transition timer). For example, a relay node may maintain two timers. An MT of the relay node may maintain the uplink timing alignment timer and, upon expiration of the timing alignment timer, a DU of the relay node may start and then maintain a second timer (e.g., the transition timer). The DU of the relay node may operate in the DU transition state so long as the transition timer is active. Upon expiration of the transition timer, the relay node may declare radio link failure (RLF), the relay node may run a topology adaptation procedure, the DU may release its child node connections, etc.

In some cases, the DU transition state configuration (e.g., the behavior of the DU in the DU transition state, the configuration of the transition timer, etc.) may depend on the current state of the relay node. For example, the configuration of the DU transition state may depend on the topological state of the relay node (e.g., the hop count, number of connections, or chain location of the relay node), the mobility state of the relay node (e.g., whether the relay node is fixed, has low-speed mobility, has high-speed mobility), the scheduling state of the relay node (e.g., any pre-scheduled or upcoming communications associated with the relay node), etc. Additionally or alternatively, the DU transition state configuration may depend on the MT configuration of the relay node. For example, the duration of the transition timer may be selected in association with the MT's timer (e.g., the timing alignment timer), in association with the MT's random access channel (RACH) configuration, etc.

The DU transition state configuration may be configured or determined by the relay node itself (e.g., based on the current state of the relay node and/or the MT of the relay node). In other examples, the DU transition state configuration may be configured by a parent node of the relay node and/or a central entity (e.g., such as the IAB donor's CU). For example, the relay node may send information relating to the current state of the relay node to a parent node and/or a central entity of the network, and the parent node and/or central entity may configure the transition state of the relay node based on the current state information of the relay node.

Further, the relay node (e.g., the DU of the relay node) may indicate to its child nodes that the relay node is operating in the DU transition state. For example, the relay node may signal an indication of DU transition state operation to child nodes through master information block (MIB), system information block (SIB), remaining minimum system information (RMSI), other system information (OSI), media access control (MAC) control element (CE) signaling or radio resource control (RRC) signaling, upper-layer signaling, etc. In some cases, the indication may provide the child nodes with information regarding the new behavior of (e.g., the certain services that may be performed by) the DU in the DU transition state. In some cases, the indication may trigger child nodes to find another serving cell.

Beneficially, the resolution mechanisms described herein may reduce service interruption, signaling delay activity, unnecessary buffer flushing or RLF determinations, etc. following an implied loss of uplink synchronization due to timing alignment timer expiration. For example, in some cases, the DU transition state may allow for uplink synchronization continuity or re-establishment with antecedent devices as a means to regain access to network resources (e.g., in cases where a next TA value is received while the relay node is operating in the DU transition state, prior to expiration of the transition timer, the relay node may reestablish uplink synchronization). Even in cases where the uplink synchronization is not reestablished before the expiration of the transition timer, the DU transition state may allow for efficient handling child node offloading (e.g., via temporary continued service, notification of DU transition state operation/loss of uplink synchronization, etc.).

Aspects of the disclosure are initially described in the context of a wireless communications system. Example wireless communications systems, flowcharts, and process flows implementing the described techniques are then described. Aspects of the disclosure are further illustrated by and described with reference to apparatus diagrams, system diagrams, and flowcharts that relate to IAB link management during loss of uplink synchronization.

FIG. 1 illustrates an example of a wireless communications system 100 that supports an IAB link management during loss of uplink synchronization in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

Base stations 105 may support functionality for operations on an IAB network. For example, base stations 105 may be split into support entities (e.g., functionalities) for promoting wireless backhaul density in collaboration with NR communication access. In some cases, one or more base stations 105 may be split into associated base station CU and DU entities, where one or more DUs may be partially controlled by an associated CU. The CU entities of the one or more base stations 105 may facilitate connection between the core network 130 and the AN (e.g., via a wireline or wireless connection to the core network). The DUs of the one or more base stations 105-a may control and/or schedule functionality for additional devices (e.g., one or more alternative base stations 105, UEs 115) according to configured access and backhaul links. Based on the supported entities at the one or more base stations 105, the one or more base stations 105 may be referred to as donor base stations (e.g., or IAB donors).

Additionally, in some cases, one or more base stations 105 may be split into associated MT and base station DU entities, where MT functionality of the one or more base stations 105 may be controlled and/or scheduled by the DU entities of the one or more donor base stations (e.g., via a Uu interface). DUs associated with the one or more base stations may be controlled by MT functionality. In addition, DUs of the one or more base stations 105 may be partially controlled by signaling messages from CU entities of associated donor base stations on the configured access and backhaul links of a network connection (e.g., via an F1-application protocol (AP)). The DUs of the one or more base stations 105 may support one of multiple serving cells having associated coverage areas 110 of the network coverage area. The DUs of the one or more base stations 105 may control and/or schedule functionality for additional devices (e.g., one or more alternative base stations 105, UEs 115) according to configured access and backhaul links. Based on the supported entities at the one or more base stations 105, the base stations may be referred to as intermediary base stations (e.g., or IAB nodes).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, one or more base stations 105 may include CUs and DUs, where one or more DUs associated with a base station may be partially controlled by a CU associated with the base station. A base station CU may be a component of a database, data center, or the core network 130 (e.g., a 5G NR core network (5GC)). A base station CU may communicate with a donor base station 105 via a backhaul link 132 (e.g., a wireline backhaul or a wireless backhaul). As another example, in IAB networks (e.g., in networks with integrated access and backhaul), a base station CU (e.g., a donor base station 105-a) may communicate with the core network 130 (e.g., the NGC) via a backhaul link 132 (e.g., a wireline backhaul or wireless backhaul). The donor base station 105 may be referred to, for example in an IAB network, as an IAB donor and may be in communication with one or more IAB nodes (e.g., other base stations 105) operating as base station DUs relative to the IAB donor and one or more UEs. For example, an IAB network may include a chain of wireless devices (e.g., starting with the donor base station 105 (a RAN node that terminates an interface with the core network) and ending with a UE 115, with any number of IAB nodes in between). IAB nodes (e.g., relay nodes) may support MT functionality (which may also be referred to as UE-F) controlled and scheduled by an IAB donor, or another IAB node, as its parent node as well as DU functionality (which may also be referred to as an AN-F) relative to additional entities (e.g., IAB nodes, UEs, etc.) within the relay chain or configuration of the access network (e.g., downstream). These relay mechanisms may forward traffic along to the additional entities, extend the range of wireless access for one or more base stations, enhance the density of backhaul capability within serving cells of a coverage area 110, etc.

In wireless communications systems, devices supporting UE functionality (e.g., UEs, and other devices supporting UE-F or MT functionality) may communicate with one or more base stations or antecedent (e.g., parent) nodes using a timing configuration configured for a wireless communication link. The timing configuration may be predetermined based on various network parameters (e.g., cell size, channel configuration, etc.). In some cases, the timing configuration may be coordinated according to the UE-F of a device, and include an uplink TA value employed by the device. Accordingly, a parent node may report an estimated TA value and associated timing configuration to the device for scheduling of uplink signaling (e.g., for parent node scheduling of uplink signaling by a child node, for child node scheduling of uplink signaling based on the estimated TA value and associated timing configuration, etc.).

A TA value may correspond to a negative offset in uplink transmission scheduling to compensate for propagation delay between downlink data reception and uplink transmission (e.g., RTT) on resources of the communication link. The TA value may correspond to a fractional component, an integer component, or a combination in relation to a subframe or temporal duration to adjust the time to initiate wireless uplink transmission (e.g., an uplink transmission) such that the transmission is synchronized with network subframe timing. A transmitting device may implement the TA value such that uplink communication on the communication link may be considered uplink time aligned. In some cases, TA values may change over time due to, for example, mobility of the transmitting device, changing channel conditions, etc. As such, a parent node may transmit updated TA values. In some cases, a timer (e.g., a timing alignment timer) may be associated with a TA value, or may be reset by a transmitting device each time an update TA value is received.

Aspects of base stations 105 (e.g., IAB nodes, including DUs, MTs, etc.) and served UEs 115 may implement TA values associated with one or more configured timers (e.g., timingAdvanceTimers), to support uplink synchronization with subframe timing at the network. Each TA value and timer may be associated with one or more serving cells of the network coverage area 110. Specifically, one or more serving cells with the same estimated uplink TA and downlink timing reference cell may correspond to a TAG of the network communications. Wireless communications system 100 may employ relay chains for communications within a network architecture, such as in an exemplary IAB network architecture. Relay base stations 105 (e.g., IAB nodes) and UEs 115 may support MT functionality and communicate with one or more antecedent (e.g., upstream) base stations 105 (e.g., DUs) on the uplink. MT functionality at the relay base stations 105 may be controlled and/or scheduled by a donor base station 105 (e.g., DUs of an IAB node or IAB donor). Further, the relay base stations 105 may support DU entities controlling and scheduling additional descendant devices (e.g., base stations 105 that including MTs, UEs 115, etc.) within the IAB network on the downstream. A relay base station 105 may act as a relay between the donor base station 105 and UE 115 in both transmission directions (e.g., a relay base station 105 may relay both uplink and downlink communications). The donor base station 105 may refer to the base station containing a base station DU connected to the base station CU.

In some cases, relay base stations 105 and/or UEs 115 (e.g., each a node) may experience potential configured timer expiration for one or more connections associated with a TAG. A node may consider timer expiration as an indication of a loss of uplink synchronization. In some systems, a node may flush buffers and initiate the clearing of configured downlink assignments or uplink grants of the TAG based on the timer expiration. For example, for a TAG associated with an activated primary cell (PCell) of the network connection (e.g., a primary TAG (pTAG)), the MT entity of a relay base station may flush all HARQ buffers for all serving cells (e.g., for the PCell and secondary cells (SCells)). In addition, the MT entity may notify RRC release of configured PUCCH and SRS and clear any configured downlink assignments and configured uplink grants. In other examples, for a TAG associated with one or more secondary serving cells of the network connection (e.g., a secondary TAG (sTAG)), the MT entity of a relay base station may flush all HARQ buffers for the sTAG, clear any configured downlink assignments and uplink grants, and notify RRC release of configured PUCCH and SRS. Such operations, however, may promote service interruptions as data transmission and reception may be suspended by the MT entity with connected DUs, allowing only RACH performance on the uplink.

According to the techniques described herein, relay base stations 105 may implement aspects to support service resolution and, in some cases, maintain uplink synchronization (e.g., after expiration of a timing alignment timer). Specifically, in some cases, relay base stations 105 may experience potential configured timer expiration for a TAG. A MT of a node (e.g., of a relay node such as potentially a base station 105) may identify that a configured timer associated with a TA of a communication link has expired. Based on the identification, the relay base station 105 may initiate a second timer (e.g., a transition timer) associated with the transitioning of a DU entity of the relay base station 105 to a DU transition state. The DU transition state may be associated with certain DU behavior for serving child nodes (e.g., other base stations 105 downstream or lower on the relay chain than the relay base station) while the transition timer is active. Configuration of the DU transition state may be identified by the relay base station 105, or configuration of the DU transition state may be received from a parent node (e.g., a donor base station 105 or other base stations 105 upstream or high on the relay chain than the relay base station). In cases where the transition timer expires prior to receiving a next TA value, the DU may declare a loss of uplink synchronization. In cases where a next TA value is received, or where uplink synchronization is reestablished, prior to the expiration of the transition timer, the DU may transition back to normal (e.g., uplink synchronized) operation (e.g., without declaring RLF).

For example, in some cases, operation of the DU in the DU transition state may allow the MT to implement one or more service enhancements to support TA command update and timer reset. In some cases, the one or more service enhancements may include allowance capability to receive updated TA commands over PDSCH following configured timer expiration. In other cases, the one or more service enhancements may include periodic resource allocation for performing contention free random access (CFRA) procedures and TA request transmission, prior to or following configured timer expiration. Additionally, in some cases, a relay base station 105 and/or UE 115 may be supported by a plurality of DUs via multiple communication links (e.g., multiple access links, wired or wireless backhaul links). Additionally or alternatively, each of the communication links may support multiple RATs (e.g., millimeter wave (mmW) and sub-6 channels) for communication. One or more service enhancements at a MT entity may include periodic resource allocation for performing CFRA procedure and TA request transmission for a first link connection based on communication with a second link connection (e.g., alternative backhaul link or RAT).

Figure 2:
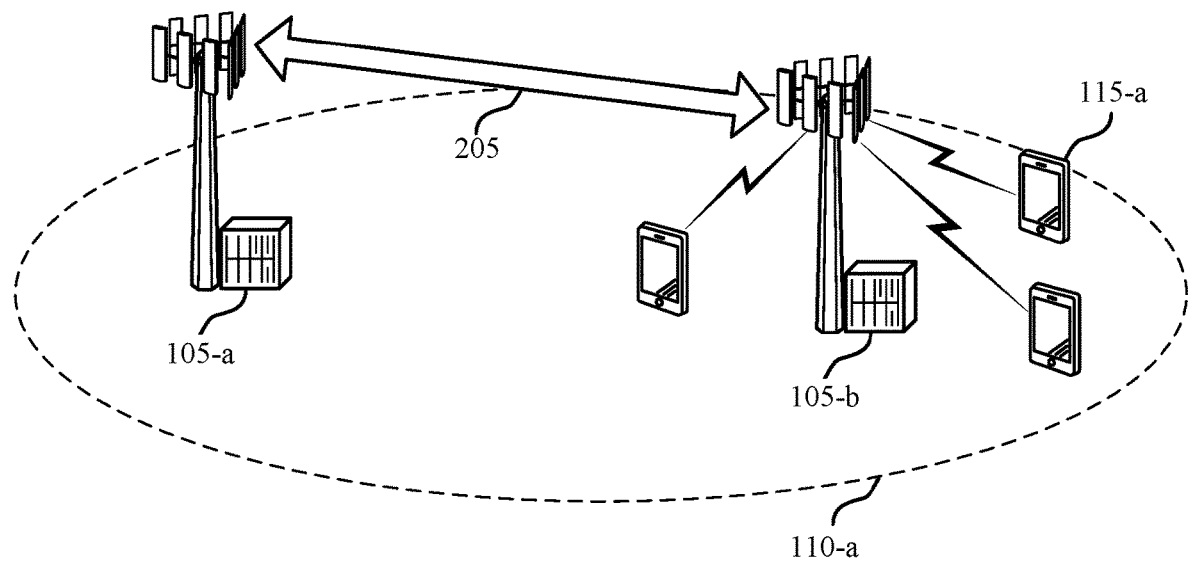
FIG. 2 illustrates an example of a wireless communications system that supports IAB link management during loss of uplink synchronization in accordance with aspects of the present disclosure.
Figure 2:
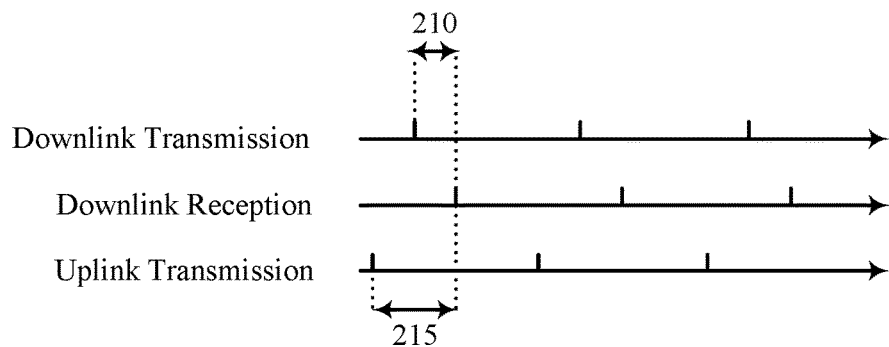

FIG. 2 illustrates an example of a wireless communications system 200 that supports IAB link management during loss of uplink synchronization in accordance with aspects of the present disclosure. In some examples, wireless communications system 200 may implement aspects of wireless communications system 100.

Wireless communications system 200 may support one or more base stations 105-a supporting network access for one or more cell coverage areas 110-a. In some cases, the one or more cell coverage areas 110-a may be non-collocated. Infrastructure and spectral resources for NR access within wireless communications system 200 may additionally support wireless backhaul link capabilities in supplement to wireline backhaul connections, providing an IAB network architecture.

One or more base stations 105-a may be split into associated base station CU and DU entities, where one or more DUs may be partially controlled by an associated CU. The CU entities of the one or more base stations 105-a may facilitate connection between the core network and the AN (e.g., via a wireline or wireless connection to the core network). The DUs of the one or more base stations 105-a may control and/or schedule functionality for additional devices according to configured wireless backhaul and access links. Based on the supported entities at the one or more base stations 105-a, the base stations may be referred to as IAB donors. Additional base stations 105-b may support link connectivity with the one or more IAB donors as part of a relay chain within the IAB network architecture. For example, one or more base stations 105-b may be split into associated MT and base station DU entities, where MT functionality of the base stations 105-b may be controlled and/or scheduled by DU entities of one or more base stations 105-a (e.g., IAB donors). DUs associated with a base station 105-b may be controlled by MT functionality. In addition, DUs of the one or more base stations 105-b may be partially controlled by signaling messages from CU entities of associated IAB donor nodes of the network connection (e.g., via an F1-AP). The DUs of the base stations 105-b may support one of multiple serving cells of the network coverage area 110-a. Based on the supported entities at the one or more base stations 105-b, the base stations may be referred to as IAB nodes.

MT functionality of each of the one or more base stations 105-b may be configured to support network connectivity to multiple supported entities (e.g., IAB nodes, IAB donors, DUs) of proximal base stations 105 via access and backhaul links associated with coverage areas of the IAB network. For example, IAB node functionality at base station 105-b may be supported by backhaul link 205 and controlled by DUs at a base station 105-b. DU entities of base station 105-b may support multiple access and backhaul links within the relay chain and control and/or schedule descendant IAB nodes and/or UEs 115 within (e.g., downstream) the IAB network, as illustrated. That is, an IAB node functionality at base station 105-b may act as a relay between the IAB donor functionality of a base station 105-b and one or more descendant devices (e.g., UEs 115-c) in both communication directions based on established backhaul and access connections.

Due to increased spectral capabilities associated with NR technology and resource deployments, devices of an IAB network (e.g., base stations 105, UEs 115) may support CA spanning non-collocated cell coverage areas 110-a. In some cases, disparate cell deployments may include different propagation delays associated with data communication across network resources. Intermediary devices, such as IAB nodes supported by base stations 105-b, and terminal devices, such as UEs 115, may attempt to compensate for propagation delay between downlink data reception and uplink transmission (e.g., RTT) by performing a negative offset in uplink transmission scheduling. Compensation may be based on an estimated TA provided by DUs of base stations 105-a or 105-b, and may support uplink transmission alignment with subframe timing at the network. A TA value may be dynamically implemented according to a configured timer (e.g., timeAlignmentTimer) where the IAB node may be considered uplink time aligned. In some cases, one or more serving cells of coverage area 110-a may have the same estimated uplink TA and downlink timing reference cell. Each of the serving cells of coverage area 110-a sharing a common estimated uplink TA may be recognized by the IAB node as part of a TAG.

In some cases, a relay node may be associated with more than one parent node (e.g., connected with more than one DU using more than one wireless link), such as in a dual-connectivity or carrier-aggregation case. In such cases, multiple uplink TAGs may be associated with the relay node (e.g., one for each parent node). One of the parent nodes may be a primary or master node, while the other one or more nodes may be secondary nodes. In some examples, each of the multiple TAGs may be associated with an uplink timing alignment timer. Further, a relay node may adopt multiple transition timers and DU transition states (e.g., a relay node may support a transition timer and DU transition state associated with each timing alignment timer, in cases where the relay node is associated with more than one parent node). When a timing alignment timer associated with a parent node expires, only a subset of children may be affected (e.g., and the relay node may continue normal operation with the remaining children associated with other timing alignment timers). For example, different child nodes may be served through different routes (e.g., through different parent nodes of the relay node). The relay node may thus maintain a timing alignment timer (e.g., as well as a transition timer and DU transition state in cases where the timing alignment timer expires) for each parent node, and the transition timer and DU transition state may apply to a subset of children associated with the particular parent node.

Base stations 105-a and 105-b may support backhaul link 205 connectivity between supported DUs of base station 105-b and MT functionality of base station 105-b. Link 205 may be associated with service coverage of one or more serving cells of a coverage area 110-a, as part of a TAG or TAGs. Based on a measured timing offset between uplink signaling (e.g., PUSCH, PUCCH, SRS) reception at the DUs and the network subframe timing, base station 105-b may estimate a negative offset (e.g., TA) for scheduling uplink transmission at the MT of base station 105-b. The TA may correspond to the RTT 215 experienced by the base station 105-b due to propagation delays between transmission and reception on downlink and uplink. For example, base station 105-b may estimate a TA as, for example, (RTT 215)/2= (propagation delay 210) (e.g., based on propagation delay 210 between the downlink transmission and the downlink reception). Base station 105-b may provide a signaling indication of the estimated TA (e.g., RTT 215) to MTs of base station 105-b via one or more index bits as part of a MAC random access response (RAR) or MAC CE. In addition, base station 105-b may provide a configured timer (e.g., timeAlignmentTimer) indication supporting an allowable duration for implementation of TA on associated links of the TAG. MT entities (e.g., child nodes) of the base station 105-b may then proceed to apply the TA (e.g., RTT 215) for scheduling uplink data transmission, as a means to support UL synchronization with DU entities of base station 105-b. Application of TA (e.g., RTT 215) may be supported throughout the configured timer and may be updated at the base station 105-b according to reception of a subsequent TA command.

That is, a base station 105 may estimate RTT 215 and provide uplink TA commands to, for example, a relay node. Uplink timing may be calculated as, for example, $$UL\ TX\ timing = DL\ RX\ timing - TA$$

The relay node may keep track of downlink timing and adjust uplink timing according to TA values (e.g., TA commands or timing configurations) received from a parent node (e.g., such as the base station 105). TA commands may thus be part of a feedback mechanism for uplink synchronization and, in some cases, may be associated with a timing alignment timer. The relay node may maintain a timing alignment timer (e.g., timeAlignmentTimer) for each TAG. Upon receiving a new TA, the timing alignment timer may be reset. If the timer expires, the relay node may assume the uplink timing is no longer synchronized. In such cases, the relay node may perform RACH on the uplink, to reestablish uplink synchronization.

In some cases, the configured timer associated with a TA on one or more network links may be configured to infinity, allowing for a maintained TA throughout the service connection. Such a configuration may be particularly suitable for fixed UEs or fixed relays within the relay chain of an IAB network. In other cases, the configured timer associated with a TA may be configured to a fixed duration. A UE-F of a device may implement the TA value according to the configured timer, where communication on one or more network links may be considered uplink time aligned. Due to the possibility of a fixed timer duration, UE-F supported devices (e.g., MTs of a base station 105-b, UEs 115) may experience potential configured timer expiration for one or more connections (e.g., link 205) associated with the TAG. The devices may consider timer expiration as an indication of a loss of uplink synchronization. As a result, MTs of base station 105-b and/or UEs 115 of the one or more network links may implement aspects to support enhanced service resolution capabilities despite configured timer expiration.

For example, upon expiration of the timing alignment timer, a relay node may transition to a DU transition state. The DU transition state may provide for enhanced service resolution, for example, for child node communications during a potential loss of synchronization. That is, the DU transition state may provide the relay node with the ability or option to serve child nodes, indicate to child nodes that there is a loss of uplink synchronization, etc. In some cases, the DU transition state may allow the relay node to communicate with child nodes prior to the relay node declaring a loss of uplink synchronization. In some cases, the DU transition state may allow the relay node to receive a next TA value (e.g., beyond the expiration of the timing alignment timer), and reestablish uplink synchronization.

Figure 3:
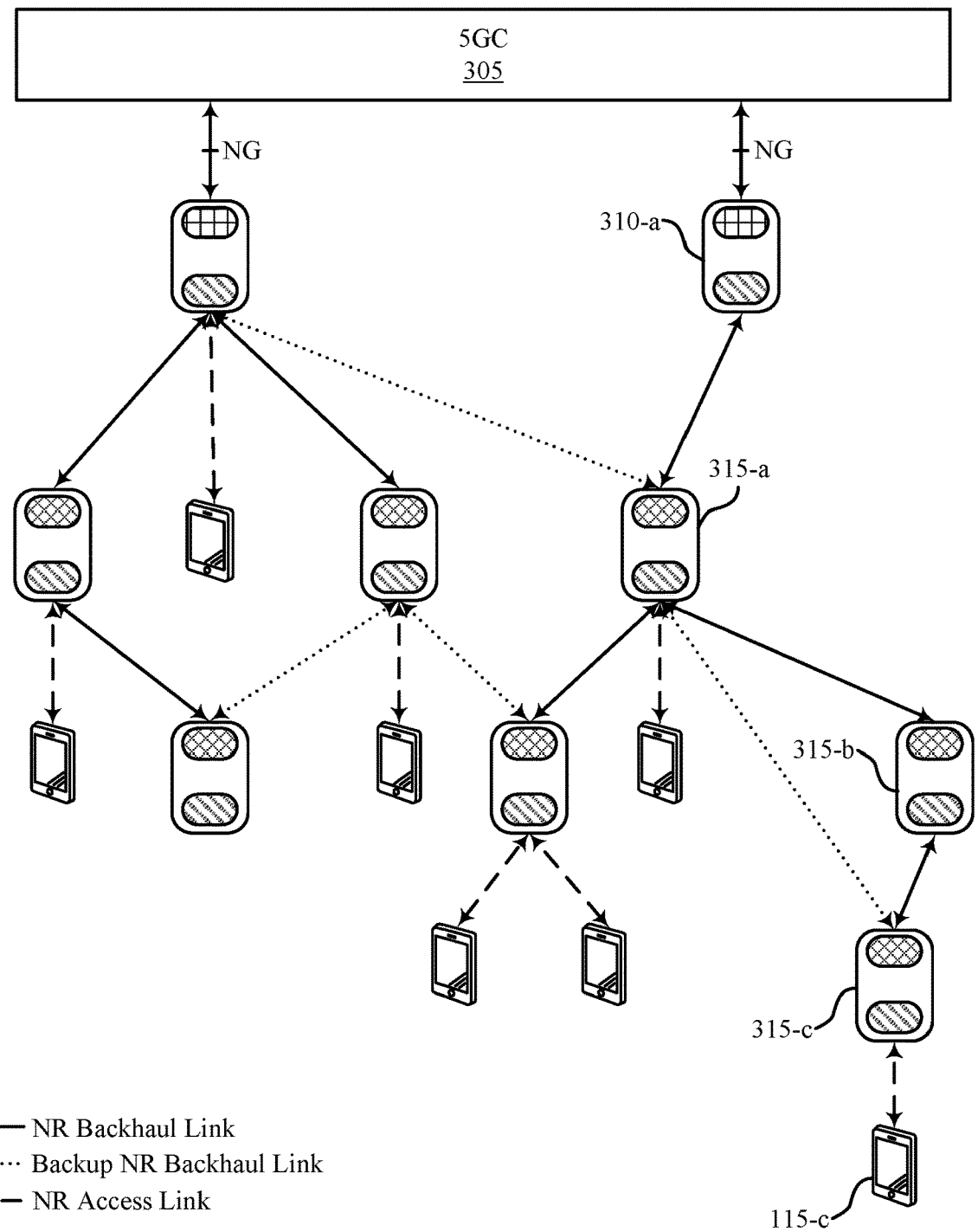
FIG. 3 illustrates an example of a wireless communications system that supports IAB link management during loss of uplink synchronization in accordance with aspects of the present disclosure.

FIG. 3 illustrates an example of a wireless communications system 300 that supports IAB link management during loss of uplink synchronization in accordance with aspects of the present disclosure. For example, FIG. 3 illustrates a wireless communications system 300 (e.g., a NR system) that supports sharing of infrastructure and spectral resources for NR access with wireless backhaul link capabilities, in supplement to wireline backhaul connections, providing an IAB network architecture. Wireless communications system 300 may include a core network 305 (e.g., NGC), and base stations or supported devices split into one or more support entities (e.g., functionalities) for promoting wireless backhaul density in collaboration with NR communication access. Aspects of the supporting functionalities of the base stations may be referred to as IAB nodes. In some examples, wireless communications system 300 may implement aspects of wireless communications system 100 and wireless communications system 200, as described with reference to FIGS. 1 and 2.

Wireless communications system 300 may include one or more IAB donor nodes 310 split into associated base station CU and DU entities, where one or more DUs associated with an IAB donor node 310 may be partially controlled by an associated CU. CUs of IAB donor nodes 310 may host layer 3 (L3) (e.g., RRC, service data adaption protocol (SDAP), PDCP, etc.) functionality and signaling. Further CUs of IAB donor nodes 310 may communicate with core network 305 over an NG interface (which may be an example of a portion of a backhaul link). DUs may host lower layer, such as layer 1 (L1) and layer 2 (L2) (e.g., RLC, MAC, PHY, etc.) functionality and signaling. A DU entity of IAB donor node 310 may support one of multiple serving cells of the network coverage according to connections associated with backhaul and access links of the IAB network. DUs of the IAB donor nodes 310 may control both access links and backhaul links within the corresponding network coverage and provide controlling and scheduling for descendant (e.g., child) IAB nodes 315 and/or UEs 115.

IAB nodes 315 may be split into associated MT and DU entities. MT functionality (e.g., UE-F) of the IAB nodes 315 may be controlled and/or scheduled by antecedent IAB nodes (e.g., by an IAB donor node 310 or another IAB node as its parent node) of the established connectivity via access and backhaul links of a coverage area. DUs associated with an IAB node 315 may be controlled by MT functionality of the node. In addition, DUs of the IAB nodes 315 may be partially controlled by signaling messages from CU entities of associated IAB donor nodes 310 of the network connection (e.g., via an F1-AP). The DUs of the IAB nodes 315 may support one of multiple serving cells of the network coverage area. DU functionality (e.g., AN-F) may schedule child IAB nodes and UEs, and may control both access links and backhaul links under its coverage.

Wireless communications system 300 may employ relay chains for communications within the IAB network architecture. For example, an IAB donor node 310 may support primary backhaul links and one or more secondary (e.g., backup) backhaul links to child IAB nodes 315. The IAB donor may further support one or more access links to additional devices (e.g., UEs 115) or entities of the network. In addition, MT functionality of each of the one or more child IAB nodes 315 and UEs 115 may be configured to support network connectivity to multiple parent nodes via access and backhaul links associated with coverage areas of the IAB network. For example, in some cases an IAB node 315 may be supported by a first (e.g., primary) backhaul link associated with a coverage area and MT functionality may be controlled and/or scheduled by a first parent node. Further, the IAB node 315 may be supported by one or more secondary backhaul links associated with a non-collocated coverage area and controlled and/or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control and/or schedule descendant IAB nodes 315 and UEs 115 within (e.g., downstream) the IAB network via the configured backhaul and access links. That is, an IAB node 315 may act as a relay between the IAB donor node 310 and one or more descendant devices (e.g., IAB nodes 315, UEs 115) in both communication directions based on established backhaul and access connections.

The supported relay chain of wireless communications system 300, including multiple backhaul and access link connections between IAB donor nodes 310, IAB nodes 315, and UEs 115, may enhance backhaul density within the coverage areas supported by the network, while achieving resource gains. That is, enhanced backhaul link coverage (e.g., increased backhaul links due to wireless backhaul on NR access technology and resources) within the wireless communications system 300 may increase supported service capacity density within a coverage area. As a result, network capacity in terms of supported user capacity density may be improved, with enhanced utilization of deployed backhaul spectrum.

Aspects of TA techniques for uplink timing and uplink synchronization may be applied with IAB nodes 315. An IAB node 315-b may keep track of parent timing (e.g., of IAB node 315-a). That is, IAB node 315-a may transmit TA commands to IAB node 315-b. IAB node 315-b may associate a timing alignment timer with received TA commands. In cases where the timing alignment timer expires, IAB node 315-b may transition a DU entity of the IAB node 315-b to a DU transition state. For example, an MT entity of IAB node 315-b (e.g., a relay node) may identify that a configured timing alignment timer for serving cells of a TAG has expired (e.g., and that uplink synchronization with IAB node 315-a may be lost).

As discussed above, in some cases, a relay node may be associated with more than one parent node and/or multiple uplink TAGs may be associated with the relay node, where each of the multiple TAGs may be associated with an uplink timing alignment timer. In some examples (e.g., if one of the parent nodes is a primary or master node, and the remaining parent nodes are secondary nodes), the relay node may begin the transition timer only if the relay node loses synchronization with the primary node. That is, in cases where the relay node is in communication with more than one parent node, the relay node may start the transition timer (e.g., and operate in the DU transition state) upon expiration of a timing alignment timer associated with the primary node (e.g., or TA values associated with the TAG of the primary parent node). In another example, the relay node may start the transition timer if any of the timing alignment timers (e.g., associated with any of the parent nodes) expire. In yet another example, the relay node may adopt multiple timers and multiple DU transition states (e.g., with respect to the multiple child nodes of the relay node). In such cases, when the timing alignment timer associated with a parent node expires, only a subset of child nodes may be affected (e.g., while the relay node continues its normal operation with the rest of the relay node's child nodes, as different child nodes may be served through different routes or chains, such that loss of uplink synchronization with one parent node may not necessarily affect the relay nodes ability to serve all child nodes).

Upon the expiration of the timing alignment timer, the IAB node 315-b (e.g., a DU entity or DU functionality of the IAB node 315-b) may enter a DU transition state. For example, the IAB node 315-b may communicate with one or more child nodes (e.g., such as IAB node 315-c) according to the DU transition state. A DU transition state may refer to certain behavior of, or operations performable by, IAB node 315-*b* or DU entity/DU functionality of IAB node 315-*b* after expiration of the timing alignment timer (e.g., the TA timer). That is, the DU transition state may refer to IAB node 315-*b* DU functionality when the uplink timing of the IAB node 315-*b* MT functionality is lost (e.g., when the MT entity of IAB node 315-*b* has lost uplink synchronization). For example, in some cases, IAB node 315-*b* DU functionality may become inactive in the DU transition state, may continue normal operation in the DU transition state, may become semi-active with a reduced set of offered services in the DU transition state, etc. In some cases, the DU transition state may be associated with a transition state timer (e.g., a transition timer). For example, IAB node 315-*b* may maintain two timers. An MT of IAB node 315-*b* may maintain the uplink timing alignment timer and, upon expiration of the timing alignment timer, a DU of IAB node 315-*b* may maintain a second timer (e.g., the transition timer). The DU of IAB node 315-*b* may operate in the DU transition state so long as the transition timer is active. In some cases, upon expiration of the transition timer, IAB node 315-*b* may declare RLF, IAB node 315-*b* may run a topology adaptation procedure, the DU of IAB node 315-*b* may release its child node connections (e.g., its child node connections corresponding to the expired transition state or the expired timing alignment timer), etc.

In some cases, the DU transition state configuration (e.g., the behavior of the DU in the DU transition state, the configuration of the transition timer, etc.) may depend on the current state of IAB node 315-*b*. For example, the configuration of the DU transition state may depend on IAB node 315-*b* topology, mobility, scheduling, etc. The topological state of IAB node 315-*b* (e.g., the hop count, number of connections, or chain location of IAB node 315-*b*) may refer to how close the IAB node 315-*b* is to the top of the relay chain (e.g., to IAB donor node 310-*a*). In some cases, the topological state may refer to the number of connections in the downstream (e.g., the number of child nodes the relay node has) and/or the number of connections in the upstream (e.g., the number of parent nodes the relay node has). For example, in some cases, the closer an IAB node is to the IAB donor node, the shorter the transition timer may be configured (e.g., as it may be desirable for the higher level intermediary IAB node to be more sensitive as it may serve relatively more children, grandchildren, etc. down the relay chain). The topology state may also refer to how many children the IAB node serves. For example, in cases where an intermediary IAB node serves a relatively large number of children, the transition timer may be relatively shorter (e.g., as more children nodes, and potentially more grandchildren nodes, may be affected). The mobility state of IAB node 315-*b* (e.g., whether IAB node 315-*b* is fixed, has low-speed mobility, has high-speed mobility) may refer to the mobility of the link associated with IAB node 315-*b*. The scheduling state of IAB node 315-*b* (e.g., any pre-scheduled or upcoming communications associated with IAB node 315-*b*) may refer to the scheduling state of IAB node 315-*b* and/or children of IAB node 315-*b*. For example, if IAB node 315-*b* has a relatively large amount of buffered downlink data, the transition timer may be set to a relatively longer time duration, such that the IAB node 315-*b* may transmit the buffered information prior to, for example, forfeiting the connection due to the loss of uplink synchronization.

Additionally or alternatively, the DU transition state configuration may depend on the MT configuration of IAB node 315-*b*. For example, the duration of the transition timer may be selected in association with the MT's timer (e.g., the timing alignment timer) and timeline before declaring an RLF. In some cases, the duration of the transition timer may be selected in association with the MT's RACH configuration (e.g., the number of RACH msg 1 transmissions (preambleTransMax)), the MT's RACH periodicity (e.g., the period the MT transmits RACH), the RAR window, etc. For example, the duration of the transition timer may be selected such that the MT has an additional chance, or a certain number of additional chances (e.g., RACH transmissions, RAR windows, etc.), to receive a next TA value (e.g., and potentially reestablish uplink synchronization).

In some cases, the DU transition state configuration may be configured or determined by IAB node 315-*b* itself (e.g., based on the current state of IAB node 315-*b* and/or the MT of IAB node 315-*b*). In some cases, the DU transition state configuration may be configured by a parent node of IAB node 315-*b* (e.g., IAB node 315-*a*) and/or a central entity (e.g., such as the IAB donor node 310-*a*'s CU). For example, IAB node 315-*b* may send information relating to the current state of IAB node 315-*b* (e.g., and/or information pertaining to the MT functionality of the IAB node 315-*b*) to IAB node 315-*a* and/or IAB donor node 310-*a*. The IAB node 315-*a* and/or IAB donor node 310-*a* may configure the transition state of IAB node 315-*b* based on the current state information of IAB node 315-*b*. For example, IAB node 315-*a* may indicate a transition timer configuration (e.g., a transition timer duration), information indicative of behavior in the DU transition state (e.g., certain operations for the IAB node 315-*b* to perform in the DU transition state), or both, to IAB node 315-*b*. IAB node 315-*a* may convey such information through MAC CE, RRC signaling, MIB/SIB/RMSI/OSI, or other upper-layer signaling. Additionally or alternatively, IAB donor node 310-*a* may indicate a transition timer configuration, information indicative of behavior in the DU transition state, or both, to IAB node 315-*b*. IAB donor node 310-*a* may convey such information through RRC signaling or other upper-layer signaling (e.g., over F1-AP interface).

Behavior of the DU in the DU transition state (e.g., the certain operations performable by the DU in the DU transition state, per the DU transition state configuration) may range from the DU being inactive, the DU becoming semi-active (e.g., with a reduced set of services), and the DU continuing normal operation. Example operations of the DU (e.g., in either a semi-active or normal operation DU transition state) may include continuing to serve buffered downlink traffic, stopping serving of buffered downlink traffic and flushing the buffers, stopping serving the buffered downlink traffic and maintaining the buffers, stopping reception of scheduled uplink transmissions, buffering uplink transmissions (e.g., and waiting for uplink synchronization to be reestablished to transfer the buffered data to the IAB donor node 310-*a*), sending acknowledgments to IAB node 315-*c*, stopping scheduling of new uplink transmissions (e.g., to IAB node 315-*a*), continuing to transmit broadcast signals and measurement references (e.g., synchronization signal blocks (SSB), MIB, SIB, channel state information reference signals (CSI-RS), tracking reference signals (TRS), etc. Other DU operations may also be performed in the DU transition state. The DU transition state (e.g., which of the above described actions or operations may be performed in the DU transition state) may depend on the architecture of the IAB node 315-*b* (e.g., L3 or L2 relay), the traffic type (e.g., some traffic types, such as urgent messages, may be served immediately), the capability of the IAB node 315-*b*, the current state of the IAB node 315-*b* (e.g., topology state, mobility state, scheduling state, etc.), etc. In some cases, as discussed above, the DU transition state configuration may indicate which of the above described actions or operations may be performed in the DU transition state.

Further, IAB node 315-*b* (e.g., the DU of IAB node 315-*b*) may indicate to its child nodes (e.g., such as IAB node 315-*c*) that IAB node 315-*b* is operating in the DU transition state. In some cases, the indication may provide the IAB node 315-*c* with information regarding the new behavior of (e.g., the certain services that may be performed by) the DU of IAB node 315-*b* in the DU transition state. For example, in some cases, the indication may cancel uplink and/or downlink communications, reduce services, etc. associated with the child IAB node 315-*c*. In some cases, the indication may trigger IAB node 315-*c* to find another serving cell. For example, IAB node 315-*b* may signal an indication of DU transition state operation to IAB node 315-*c* through MIB, SIB, RMSI, OSI, MAC-CE or RRC signaling, upper-layer signaling, etc. In some cases, IAB node 315-*c* may monitor for MIB (e.g., which may be part of a physical broadcast channel (PBCH) transmitted by IAB node 315-*b*), and may detect primary synchronization signal (PSS)/secondary synchronization signal (SSS)/discovery reference signal (DRS). In some cases, such information (e.g., the MIB) may include a cell-barring bit that may indicate that the cell (e.g., associated with IAB node 315-*b*) is barred and cannot provide service to the IAB node 315-*c*.

Figure 4:
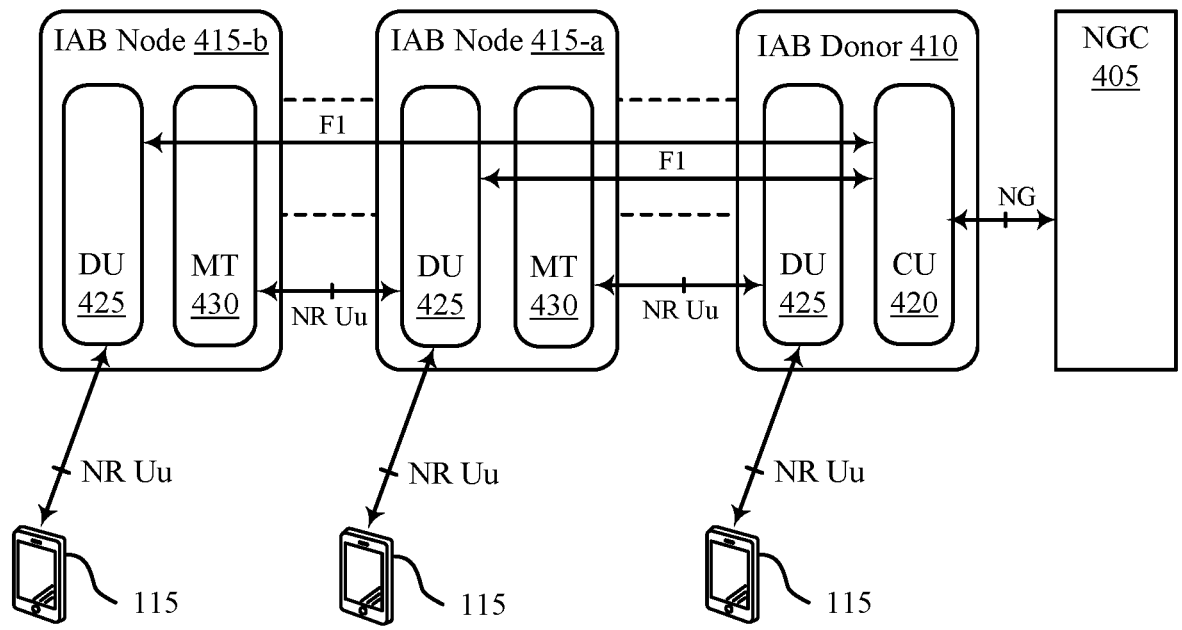
FIG. 4 illustrates an example of a wireless communications system that supports IAB link management during loss of uplink synchronization in accordance with aspects of the present disclosure.

FIG. 4 illustrates an example of a wireless communications system 400 that supports IAB link management during loss of uplink synchronization in accordance with aspects of the present disclosure. Wireless communications system 400 may include a core network 405 (e.g., an NGC), an IAB donor node 410, IAB nodes 415, and UEs 115, where IAB nodes 415 may be partially controlled by each other and/or the IAB donor node 410. The IAB donor node 410 and IAB nodes 415 may be examples of aspects of base stations 105, and core network 405 may be an example of aspects of core network 230, as described with reference to FIG. 2. IAB donor node 410 and one or more IAB nodes 415 may be configured as (e.g., or in communication according to) some relay chain.

For example, an access network (AN) may refer to communications between access nodes (e.g., IAB donor node 410), IAB nodes 415-*a* and 415-*b*, and UEs 115. The IAB donor node 410 may facilitate connection between the core network 405 and the AN (e.g., via a wireline or wireless connection to the core network 405). That is, an IAB donor node 410 may refer to a radio access network (RAN) node with a wireline or wireless connection to core network 405. The IAB donor node 410 may include a CU 420 and at least one DU 425, where the CU 420 may communicate with the core network 405 over an NG interface (e.g., some backhaul link 132). CU 420 may host L3 (e.g., RRC, SDAP, PDCP, etc.) functionality and signaling. DUs 425 may host lower layer, such as L1 and L2 (e.g., RLC, MAC, PHY, etc.) functionality and signaling, and may each be at least partially controlled by CU 420. DU 425 may support one or multiple different cells. IAB donor node 410 and IAB nodes 415-*a* and 415-*b* may communicate over an F1 interface according to some protocol that defines signaling messages (e.g., F1-AP protocol). Further, CU 420 may communicate with the core network 405 over an NG interface (which may an example of a portion of backhaul link 132), and may communicate with other CUs 420 (e.g., a CU associated with an alternative IAB donor node 410) over an Xn-C interface (which may an example of a portion of a backhaul link).

IAB nodes 415 may refer to a RAN node that provides IAB functionality (e.g., access for UEs 115, wireless self-backhauling capabilities, etc.). IAB nodes 415 may include a DU 425 and a MT 430. A DU 425 may act as a distributed scheduling node towards child nodes associated with the IAB node 415, and the MT 430 may act as a scheduled node towards parent nodes associated with the IAB node 415. That is, an IAB donor node 410 may be referred to as a parent node in communication with one or more child nodes (e.g., an IAB donor may relay transmissions for UEs through one or more other IAB nodes 415). Further, an IAB node 415 may also be referred to as a parent node or a child node to other IAB nodes 415, depending on the relay chain or configuration of the AN. Therefore, the MT entity of IAB nodes (e.g., MTs 430) may provide a Uu interface for a child node to receive signaling from a parent IAB node, and the DU interface (e.g., DUs 425) may provide a Uu interface for a parent node to signal to a child IAB node or UE 115.

For example, IAB node 415-*a* may be referred to as a parent node associated with IAB node 415-*b*, and a child node associated with IAB donor node 410. The IAB donor may include a CU 420 with a wireline (e.g., optical fiber) or wireless connection to the core network 225, and may act as parent node to IAB nodes 415-*a* and 415-*b*. For example, the DU 425 of IAB donor node 410 may relay transmissions to UEs 115 through IAB nodes 415. The CU 420 of IAB donor node 410 may signal communication link establishment via an F1 interface to IAB nodes 415-*a* and 415-*b*, and the IAB nodes 415-*a* and 415-*b* may schedule transmissions (e.g., transmissions to the UEs 115 relayed from the IAB donor node 410) through the DUs 425. That is, data may be relayed to and from IAB nodes 415-*a* and 415-*b* via signaling over an NR Uu interface to MT 430 of the IABs node 415-*a* and 415-*b*. Communications with IAB node 415-*a* may be scheduled by DU 425 of IAB donor node 410 and communications with IAB node 415-*b* may be scheduled by DU 425 of IAB node 415-*a*.

In the following description, mechanisms for service resolution and maintenance of uplink synchronization may be described in terms of actions and processes performed by MTs 430 of one or more IAB nodes 415 and/or one or more UEs 115. The IAB nodes 415 may correspond to one or more relay base stations. The MT entities 430 of IAB nodes 415 or MT functionality of the UEs 115 may receive one or more TA values and timing configurations associated with access and backhaul links of the IAB network, for uplink transmission synchronization. Each TA and configured timer may correspond to one or more serving cells (e.g., one or more TAGs) supported within the IAB network that share an uplink TA and downlink timing reference cell. The TA for each TAG may be estimated by a DU entity of the communication link and may be used at the MT as a timing reference for uplink during link procedures (e.g., initial access, radio link failure, during handover, etc.). In some cases, the TA for access or backhaul connection associated with a TAG may be indicated by an index value within a MAC RAR, as part of a connection establishment. In other cases, when connectivity is established amongst DU and MT entities of the one or more IAB nodes 415 and/or UEs 115 and IAB donor node 410, the TA for backhaul connection associated with a TAG may be indicated by an index value within a MAC CE. The TA may be represented as a negative timing offset between uplink transmission and downlink reception and the MT, and may be referred to as a RTT.

A time unit in a TA value (e.g., the time units representing a TA offset) may be denoted in $T_s$ seconds (e.g., 1/(4096*480000) seconds) and indicate the change of uplink scheduled timing relative to downlink reception. The timing offset indicated by a TA may indicate scheduling of uplink data transmission by MTs. For example, a TA estimated by a DU of IAB donor node 410 may indicate timing synchronization for uplink signaling by MTs 430 associated with IAB nodes 415 and/or UEs 115-*a*. TA values may be provided to the associated MT entities and/or UEs according to a Uu or F1 interface associated with the supported backhaul links.

Figure 5:
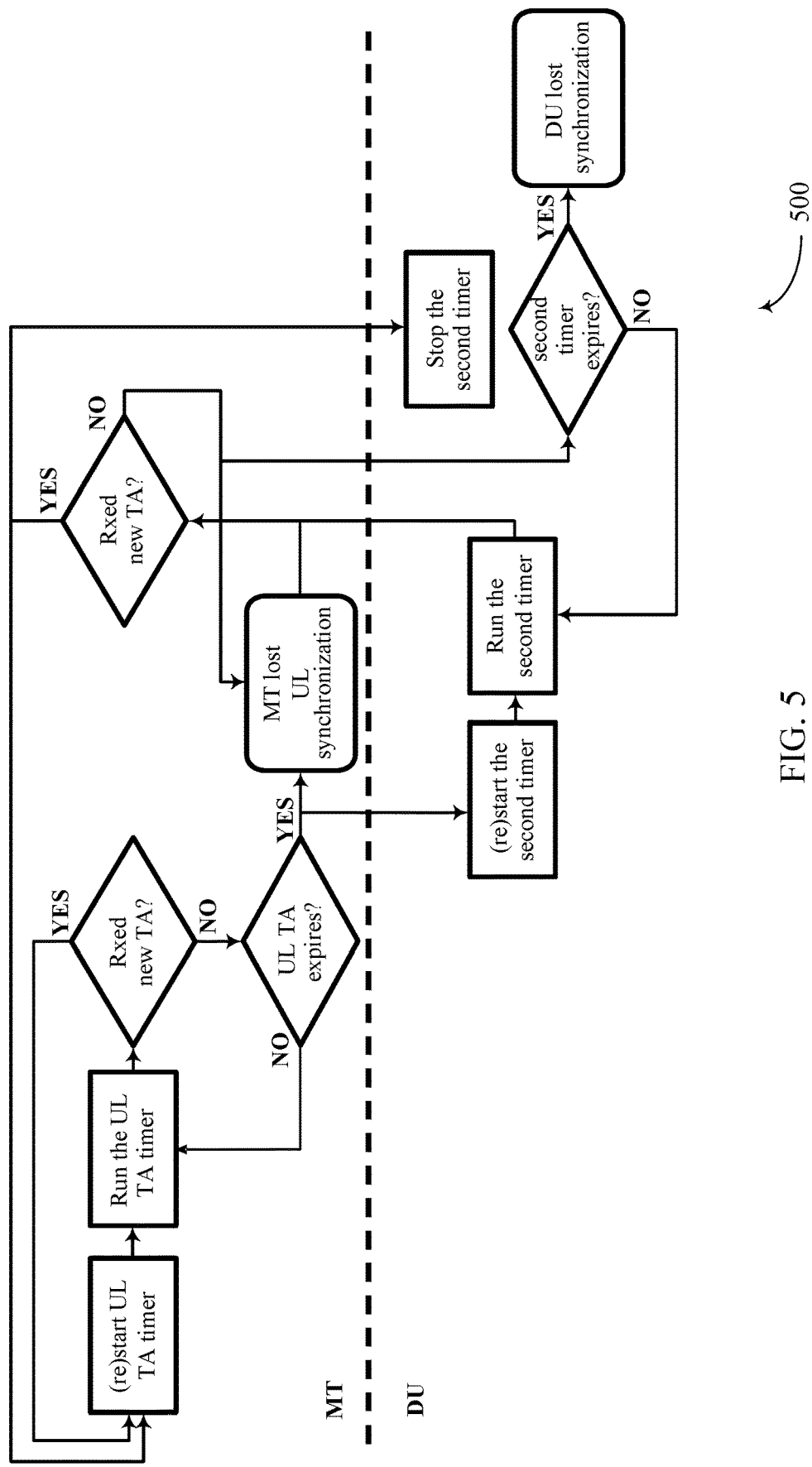
FIG. 5 illustrates an example of a flowchart that supports IAB link management during loss of uplink synchronization in accordance with aspects of the present disclosure.

FIG. 5 illustrates an example of a flowchart 500 that supports IAB link management during loss of uplink synchronization in accordance with aspects of the present disclosure. In some examples, flowchart 500 may implement aspects of wireless communications system 100-400. Flowchart 500 may illustrate operations of a relay node (e.g., an intermediary IAB node), as described with reference to FIGS. 1 through 4. As described, mechanisms for performing one or more processes of the described techniques may be performed by an MT entity (e.g., a UE-F) and a DU entity (e.g., a AN-F) of an IAB node.

For example, an MT may maintain an uplink timing alignment timer for a wireless link between the IAB node (e.g., the MT of the IAB node) and a parent node. The MT may start, or restart, the timing alignment timer (e.g., or the TA timer) each time a new TA value (e.g., indicated by a TA command) is received. That is, the MT may start a timing alignment timer for each TA (e.g., or each TAG), and the MT may run the timing alignment timer until a new TA is received (resetting the timer) or until the timing alignment timer expires. As discussed above, the duration of the timing alignment timer may be set to various different values and, in some cases, may be specific to the relay node, specific to the TAG, or both.

Upon expiration of the timing alignment timer, the MT may identify a loss of uplink synchronization. Additionally, the DU of the relay node may start a second timer (e.g., the transition timer) upon expiration of the timing alignment timer. The DU may run the transition timer until a new TA is received (e.g., via efforts of the MT after timing alignment timer expiration, such as RACH procedures, etc.), in which case the transition time may be stopped, or until the transition timer expires. As discussed above, the relay node may operate the DU in a DU transition state while the transition timer is active. Upon expiration of the transition timer, the DU (e.g., the relay node) may identify the DU has lost uplink synchronization. In such cases, the DU may, for example, declare an RLF, adapt the topology of the network, find a new parent cell, release connections with child nodes, etc.

Figure 6:
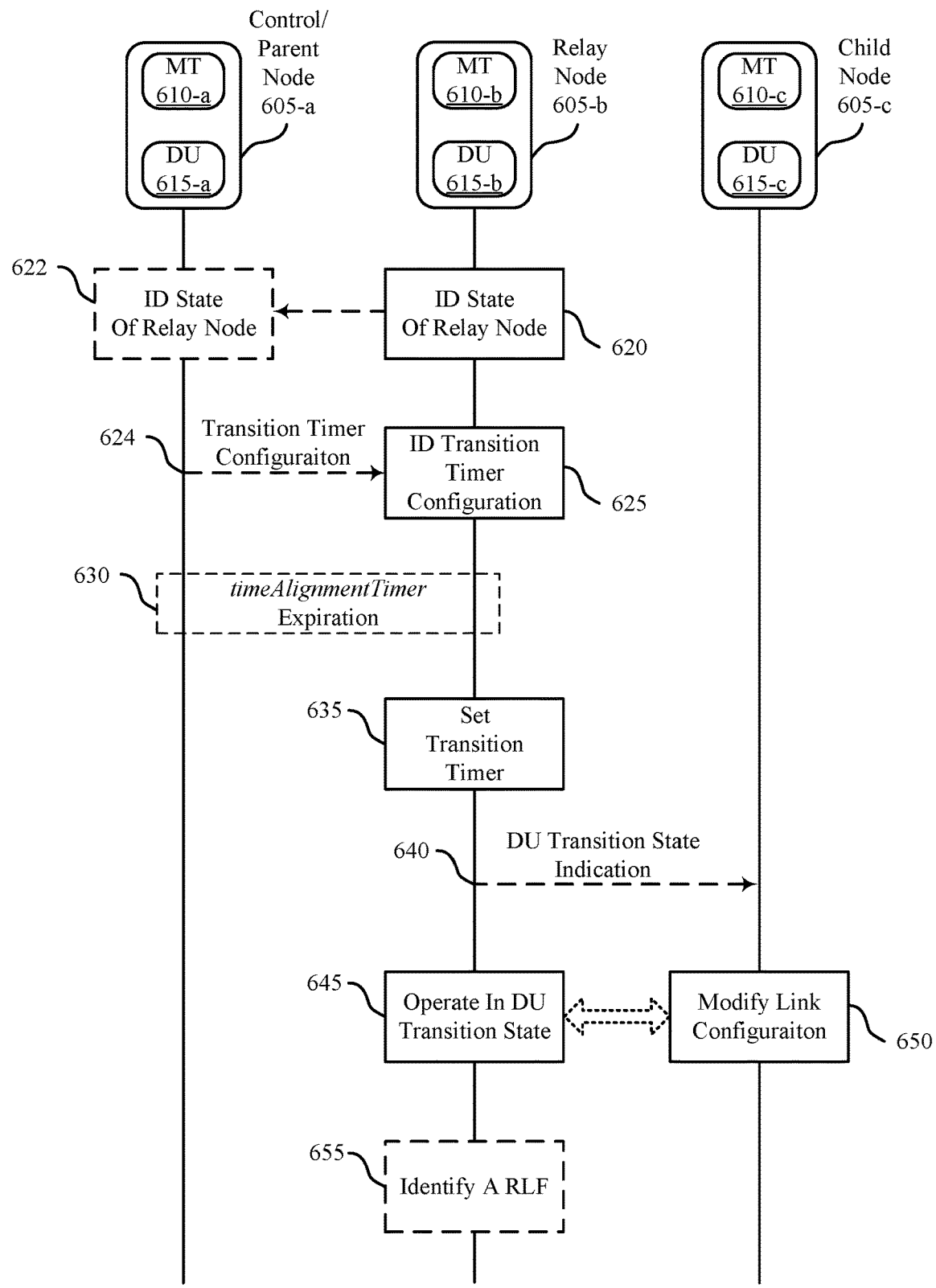
FIG. 6 illustrates an example of a process flow that supports IAB link management during loss of uplink synchronization in accordance with aspects of the present disclosure.

FIG. 6 illustrates an example of a process flow 600 that supports IAB link management during loss of uplink synchronization in accordance with aspects of the present disclosure. In some examples, process flow 600 may implement aspects of wireless communications systems 100-400. Process flow 600 may include one or more IAB nodes 605, which may be examples of supporting functionality within a base station 105 of an IAB network architecture, as described with reference to FIGS. 1 through 5. Process flow 600 may illustrate a relay node (e.g., IAB node 605-*b*) operating in a DU transition state upon expiration of a timing alignment timer (timeAlignmentTimer). In the following description of the process flow 600, the operations between the IAB nodes 605 may be transmitted in a different order than the exemplary order shown, or the operations performed by the IAB nodes 605 may be performed in different orders or at different times. In some cases, certain operations may also be left out of the process flow 600, or other operations may be added to the process flow 600.

Process flow 600 may illustrate a relay node 605-*b* in communication with a parent or control node (e.g., IAB node 605-*a*) and a child node (e.g., IAB node 605-*c*). In some cases, IAB node 605-*a* may refer to an IAB donor, in which case the MT 610-*a* of IAB node 605-*a* may instead be a CU. DU 615-*b* associated with an IAB node 605-*b* may be partially controlled and/or scheduled by MT 610-*b*. DU 615-*b* may host lower layer, such as L1 and L2 (e.g., RLC, MAC, PHY, etc.), functionality and signaling. IAB node 605-*b* may be a descendant (e.g., child) node relative to IAB node 605-*a* within the relay chain. In some cases, IAB node 605-*b* may include MT 610-*b* and DU 615-*b*. MT 610-*b* may be controlled and/or scheduled by DU 615-*a* of IAB node 605-*a* (e.g., parent node) via access and backhaul links of the IAB network. In addition, in some cases, DU 615-*b* may be partially controlled and/or scheduled by signaling messages from a CU of an IAB donor (e.g., via an F1-AP). DU 615-*b* may support one or more wireless backhaul and/or access links within the relay chain, providing network services to one or more descendant devices throughout the network (e.g., such as IAB node 605-*c*). DU 615-*b* may host lower layer, such as L1 and L2 (e.g., RLC, MAC, PHY, etc.), functionality and signaling.

At 620, IAB node 605-*b* may identify a state of the IAB node 605-*b*. For example, the IAB node 605-*b* may identify a topology state of the IAB node 605-*b*, a mobility state of the IAB node 605-*b*, a scheduling state of the IAB node 605-*b*, a configuration of a MT of the IAB node 605-*b*, etc.

At 625, IAB node 605-*b* may identify a transition timer configuration. For example, in some cases, the IAB node 605-*b* may identify the transition timer configuration based on a state of the IAB node 605-*b* identified at 620. In some cases, the transition timer configuration may be preconfigured.

In some examples, the IAB node 605-*b* may transmit an indication of the state of the IAB node 605-*b* (e.g., identified at 620) to the IAB node 605-*a* (e.g., a parent node). The IAB node 605-*a* may thus identify the state of the relay node (e.g., IAB node 605-*b*), and may transmit an indication of a transition timer configuration to IAB node 605-*b*. That is, in some cases, the IAB node 605-*a* may determine the transition timer configuration for IAB node 605-*b*, and may transmit an indication of the transition timer configuration to IAB node 605-*b*. In such cases, the IAB node 605-*b* may identify the transition timer configuration (e.g., at 625) based on the indication received at 624. In some cases, IAB node 605-*a* may refer to a control node, a central entity, etc. In some cases, the IAB node 605-*a* may transmit the transition timer configuration based on identifying that the timing alignment timer has expired (e.g., at 630). That is, in some cases, 624 and 625 may occur after 630, and the timing alignment timer expiration may instigate the configuration of the transition timer.

At 630, a timing alignment timer (e.g., timeAlignmentTimer) associated with an assigned TA for MT 610-*b* may expire without renewal. The TA may be associated with uplink scheduling on a communication link between IAB node 605-*b* and IAB node 605-*a*, and may be controlled and/or scheduled by DU 615-*a* of the IAB node 605-*a*. In some cases, the TA may be associated with one or more additional communication links over serving cells corresponding to a TAG.

At 635, IAB node 605-*b* (e.g., DU 615-*b*) may set a transition timer (e.g., based on the expiration of the timing alignment timer at 630). The transition timer may correspond to a communication link between the IAB node 605-*b* and IAB node 605-*c* (e.g., a child node of the relay IAB node 605-*b*). While the transition timer is active, the IAB node 605-*b* (e.g., DU 615-*b*) may operate in a DU transition state.

At 640, the IAB node 605-*b* may, in some cases, transmit an indication that the IAB node 605-*b* is operating in a DU transition state to IAB node 605-*c*.

At 645, the IAB node 605-*b* may operate in the DU transition state (e.g., based on the transition timer being set).

At 650, the IAB node 605-*c* may modify a configuration of a communication link between the IAB node 605-*c* and the IAB node 605-*b* based on, for example, the indication received at 640. For example, the IAB node 605-*c* may search for a new serving cell in response to the indication received at 640, and may cease communication with the IAB node 605-*b*. In some cases, modifying the configuration of the communication link between the IAB node 605-*c* and the IAB node 605-*b* may include canceling an uplink communication with the IAB node 605-*b*, or a downlink communication with the IAB node 605-*b*, or an uplink communication with a fourth node of the wireless network that is a child to the child node 605-*c*, or a downlink communication with the fourth node, etc.

At 655, if the transition timer expires prior to the IAB node 605-*b* (e.g., MT 610-*b*) identifying a new TA value, the IAB node 605-*b* may identify or declare an RLF. Alternatively, if a new TA value is identified prior to expiration of the transition timer, the IAB node 605-*b* may reestablish uplink synchronization with IAB node 605-*a*.

Though process flow 600 is described with reference to one or more IAB nodes 605, process flow 600 may also be performed in other wireless communication network contexts. For example, IAB node 605-*b* may instead be a MT or UE-F of another wireless network node or device, such that the MT or UE-F of the another wireless network node or device may enter a DU transition state during loss of uplink synchronization. Similarly, IAB node 605-*a* may instead be base station 105, or a DU or AN-F of another wireless network node or device.

Figure 7:
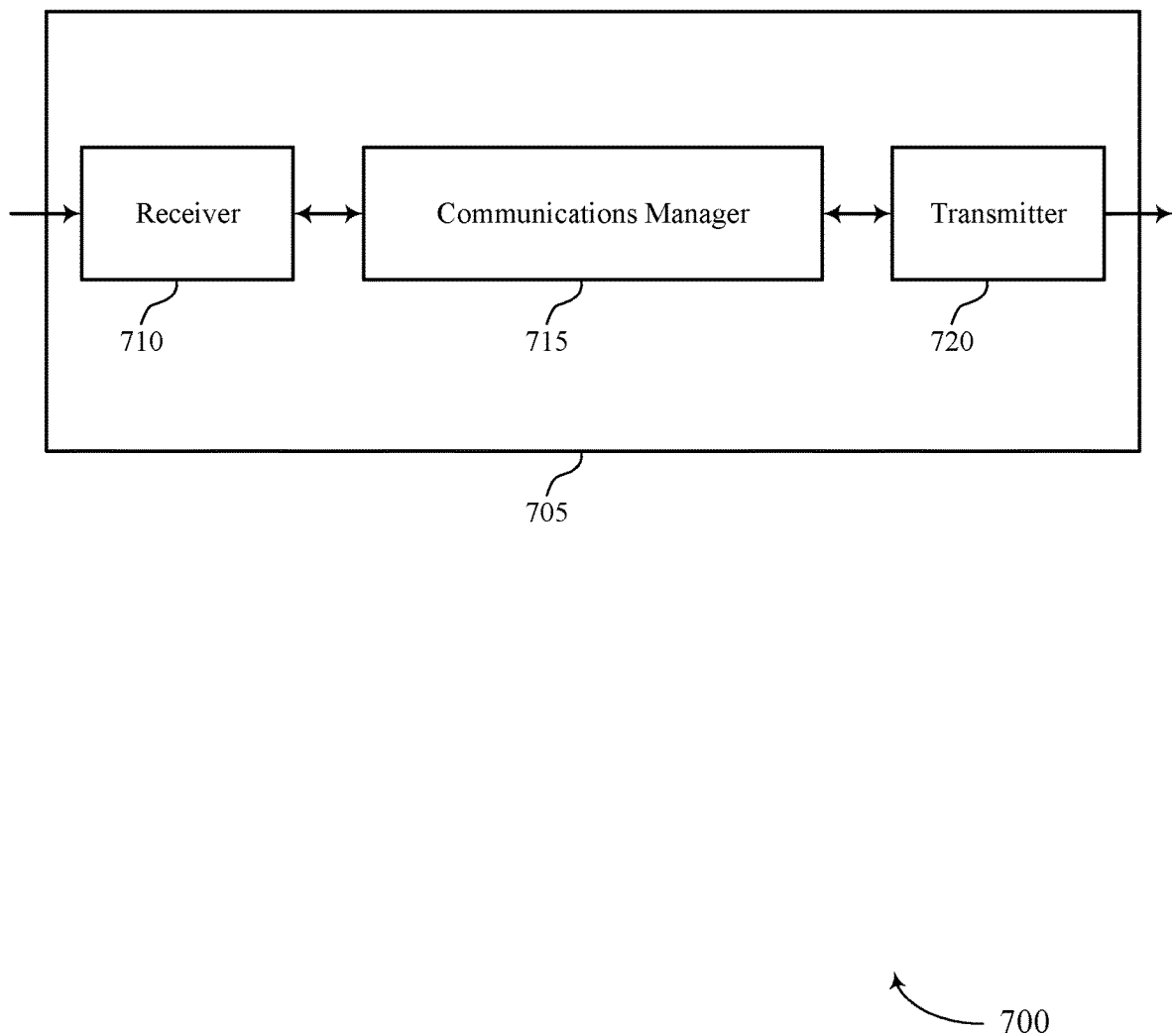
FIGS. 7 and 8 show block diagrams of devices that support IAB link management during loss of uplink synchronization in accordance with aspects of the present disclosure.

FIG. 7 shows a block diagram 700 of a device 705 that supports IAB link management during loss of uplink synchronization in accordance with aspects of the present disclosure. The device 705 may be an example of aspects of a base station 105 as described herein. The device 705 may include a receiver 710, a communications manager 715, and a transmitter 720. The device 705 may also include one or more processors, memory coupled with the one or more processors, and instructions stored in the memory that are executable by the one or more processors to enable the one or more processors to perform the IAB link management features discussed herein. Each of these components may be in communication with one another (e.g., via one or more buses).

The receiver 710 may receive information such as packets, user data, or control information associated with various information channels (e.g., control channels, data channels, and information related to IAB link management during loss of uplink synchronization, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify that a timing alignment timer for a first communication link between a parent node of the wireless communications network and the relay node has expired, set, responsive to identifying that the timing alignment timer has expired, a transition timer for a second communication link between the relay node and at least one child node of the wireless communications network, where an expiration of the transition timer indicates that the relay has lost timing synchronization with the at least one child node on the second communication link, and operate the relay node in a transition state while the transition timer is active. The communications manager 715 may also receive, from a relay node of the wireless communications network, an indication that the relay node is operating according to a transition state responsive to a timing alignment timer having expired for a first communication link between the relay node and a parent node of the relay node and modify a configuration of a second communication link between the child node and the relay node based on the received indication. The communications manager 715 may also identify a state of a relay node of the wireless communications network, where a parent node communicates with the relay node using a first communication link, determine a configuration for a transition timer of the relay node based on the identified state of the relay node, where the transition timer is for a second communication link between the relay node and at least one child node of the relay node, and the transition timer is set by the relay node responsive to an identification that a timing alignment timer for the first communication link has expired, and transmit, to the relay node, an indication of the determined configuration for the transition timer of the relay node. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 715 may perform the described functions, operations, techniques, etc. to reduce service interruption, signaling delay activity, unnecessary buffer flushing or RLF determinations, etc. For example, the communications manager 715 may set a transition timer and operate the relay node in a transition state while the transition timer is active to allow for uplink synchronization continuity or re-establishment with antecedent devices as a means to regain access to network resources (e.g., in cases where a next TA value is received while the relay node is operating in the DU transition state, prior to expiration of the transition timer, the relay node may reestablish uplink synchronization). Even in cases where the uplink synchronization is not reestablished before the expiration of the transition timer, the DU transition state managed by communications manager 715 may allow for efficient handling child node offloading (e.g., via temporary continued service, notification of DU transition state operation/loss of uplink synchronization, etc.).

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
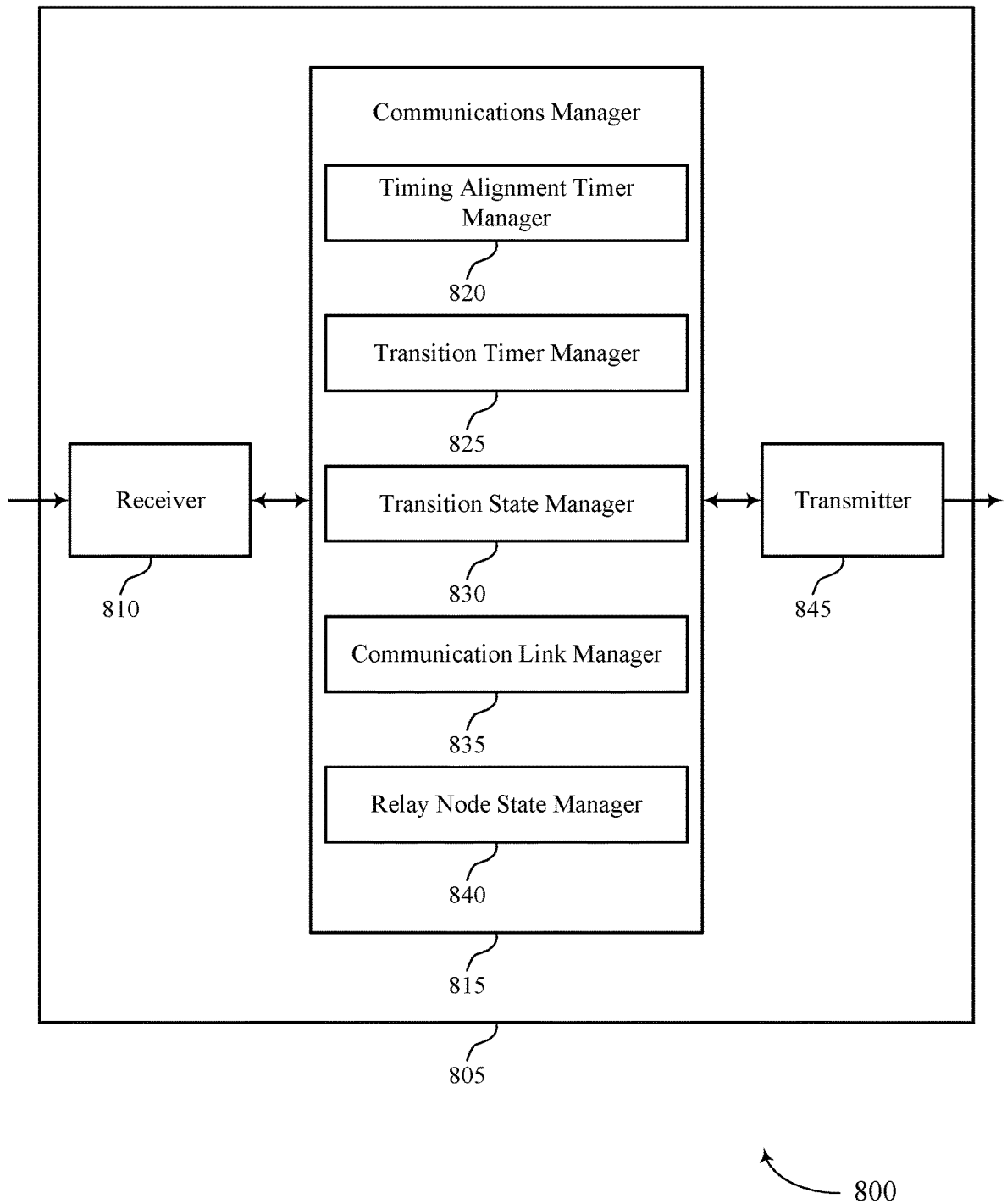

FIG. 8 shows a block diagram 800 of a device 805 that supports IAB link management during loss of uplink synchronization in accordance with aspects of the present disclosure. The device 805 may be an example of aspects of a device 705, or a base station 105 as described herein. The device 805 may include a receiver 810, a communications manager 815, and a transmitter 845. The device 805 may also include one or more processors, memory coupled with the one or more processors, and instructions stored in the memory that are executable by the one or more processors to enable the one or more processors to perform the IAB link management features discussed herein. Each of these components may be in communication with one another (e.g., via one or more buses).

The receiver 810 may receive information such as packets, user data, or control information associated with various information channels (e.g., control channels, data channels, and information related to IAB link management during loss of uplink synchronization, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a timing alignment timer manager 820, a transition timer manager 825, a transition state manager 830, a communication link manager 835, and a relay node state manager 840. The communications manager 815 may be an example of aspects of the communications manager 1010 described herein.

The timing alignment timer manager 820 may identify that a timing alignment timer for a first communication link between a parent node of the wireless communications network and the relay node has expired.

The transition timer manager 825 may set, responsive to identifying that the timing alignment timer has expired, a transition timer for a second communication link between the relay node and at least one child node of the wireless communications network, where an expiration of the transition timer indicates that the relay has lost timing synchronization with the at least one child node on the second communication link.

The transition state manager 830 may operate the relay node in a transition state while the transition timer is active. The transition state manager 830 may receive, from a relay node of the wireless communications network, an indication that the relay node is operating according to a transition state responsive to a timing alignment timer having expired for a first communication link between the relay node and a parent node of the relay node.

The communication link manager 835 may modify a configuration of a second communication link between the child node and the relay node based on the received indication.

The relay node state manager 840 may identify a state of a relay node of the wireless communications network, where a parent node communicates with the relay node using a first communication link.

The transition timer manager 825 may determine a configuration for a transition timer of the relay node based on the identified state of the relay node, where the transition timer is for a second communication link between the relay node and at least one child node of the relay node, and the transition timer is set by the relay node responsive to an identification that a timing alignment timer for the first communication link has expired and transmit, to the relay node, an indication of the determined configuration for the transition timer of the relay node.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
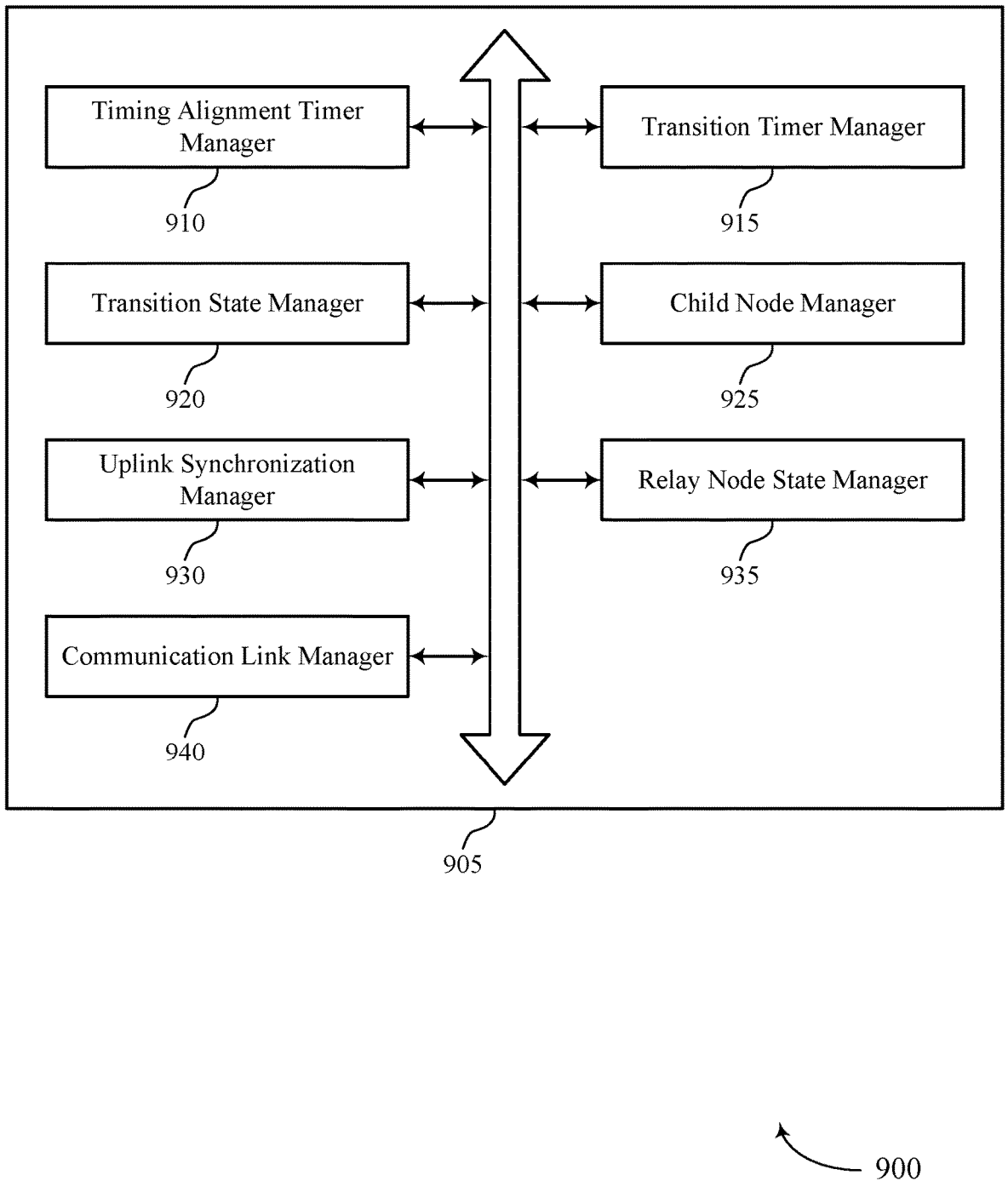
FIG. 9 shows a block diagram of a communications manager that supports IAB link management during loss of uplink synchronization in accordance with aspects of the present disclosure.

FIG. 9 shows a block diagram 900 of a communications manager 905 that supports IAB link management during loss of uplink synchronization in accordance with aspects of the present disclosure. The communications manager 905 may be an example of aspects of a communications manager 715, a communications manager 815, or a communications manager 1010 described herein. The communications manager 905 may include a timing alignment timer manager 910, a transition timer manager 915, a transition state manager 920, a child node manager 925, an uplink synchronization manager 930, a relay node state manager 935, and a communication link manager 940. Each of these modules may communicate, directly or indirectly, with one another (e.g., via one or more buses).

The timing alignment timer manager 910 may identify that a timing alignment timer for a first communication link between a parent node of the wireless communications network and the relay node has expired.

The transition timer manager 915 may set, responsive to identifying that the timing alignment timer has expired, a transition timer for a second communication link between the relay node and at least one child node of the wireless communications network, where an expiration of the transition timer indicates that the relay has lost timing synchronization with the at least one child node on the second communication link. In some examples, the transition timer manager 915 may determine a configuration for a transition timer of the relay node based on the identified state of the relay node, where the transition timer is for a second communication link between the relay node and at least one child node of the relay node, and the transition timer is set by the relay node responsive to an identification that a timing alignment timer for the first communication link has expired.

In some examples, the transition timer manager 915 may transmit, to the relay node, an indication of the determined configuration for the transition timer of the relay node. In some examples, the transition timer manager 915 may identify a configuration for the transition timer of the relay node based on the expiration of the timing alignment timer.

In some examples, the transition timer manager 915 may receive the configuration for the transition timer of the relay node from the parent node of the wireless communications network, a CU of a third node of the wireless communications network, or both. In some examples, the transition timer manager 915 may set, responsive to identifying that the timing alignment timer has expired, a set of transition timers for the second communication link between the relay node and the at least one child node. In some examples, the transition timer manager 915 may transmit the indication of the determined configuration based on the identification that by the control node that the timing alignment timer has expired.

In some examples, the transition timer manager 915 may transmit the indication of the determined configuration in a MAC CE, RRC signaling, a MIB, a SIB, a RMSI signal, an OSI signal, upper-layer signaling, or a combination thereof. In some examples, the transition timer manager 915 may transmit the indication of the determined configuration over a F1-AP interface. In some cases, the configuration for the transition timer of the relay node is based on a topology state of the relay node, a mobility state of the relay node, a scheduling state of the relay node, a configuration of a MT of the relay node, or some combination thereof. In some cases, the configuration for the transition timer is based on the timing alignment timer, a RACH configuration of the MT, or a combination thereof.

The transition state manager 920 may operate the relay node in a transition state while the transition timer is active. In some examples, the transition state manager 920 may receive, from a relay node of the wireless communications network, an indication that the relay node is operating according to a transition state responsive to a timing alignment timer having expired for a first communication link between the relay node and a parent node of the relay node. In some examples, the transition state manager 920 may refrain from communicating with the at least one child node using the second communication link when the transition timer is active. In some examples, the transition state manager 920 may continue to communicate with the at least one child node using the second communication link when the transition timer is active.

In some examples, the transition state manager 920 may continue to communicate with the at least one child node using the second communication link according to a reduced communication level while the transition timer is active, the reduced communication level reduced from a first communication level of the relay node before identifying that the timing alignment timer has expired. In some examples, the transition state manager 920 may transmit downlink traffic buffered at the relay node to the at least one child node of the wireless communications network. In some examples, the transition state manager 920 may refrain from transmitting downlink traffic buffered at the relay node to the at least one child node of the wireless communications network.

In some examples, the transition state manager 920 may flush at least one buffer for the downlink traffic for the at least one child node of the wireless communications network. In some examples, the transition state manager 920 may maintain the downlink traffic buffered for the at least one child node of the wireless communications network. In some examples, the transition state manager 920 may refrain from receiving scheduled uplink transmissions from the at least one child node of the wireless communications network. In some examples, the transition state manager 920 may receive scheduled uplink transmissions from the at least one child node of the wireless communications network. In some examples, the transition state manager 920 may buffer the received scheduled uplink transmissions.

In some examples, the transition state manager 920 may transmit one or more acknowledgements to the at least one child node of the wireless communications network based on the received scheduled uplink transmissions. In some examples, the transition state manager 920 may refrain from scheduling uplink transmissions for the at least one child node of the wireless communications network. In some examples, the transition state manager 920 may transmit a broadcast signal, or a reference signal, or a combination thereof. In some examples, the transition state manager 920 may buffered a downlink transmission, or flush a downlink buffer, or schedule an uplink transmission, or process the uplink transmission, or buffer an uplink transmission, or transmit an acknowledgment in response to the downlink transmission, or signal a broadcast transmission, or signal a reference signal, or a combination of these.

The relay node state manager 935 may identify a state of a relay node of the wireless communications network, where a parent node communicates with the relay node using a first communication link. In some examples, the relay node state manager 935 may transmit an indication of a current state of the node to the parent node of the wireless communications network, the CU of the third node of the wireless communications network, or both, where the configuration for the transition timer of the relay node is based on the current state. In some cases, the control node includes the parent node of the relay node, a fourth node of the wireless communication network, a central entity, or a combination thereof. In some cases, the state of the relay node includes a topological state, or a mobility state, or a scheduling state, or a combination thereof.

The communication link manager 940 may modify a configuration of a second communication link between the child node and the relay node based on the received indication. In some examples, the communication link manager 940 may search for a new serving cell in response to the received indication. In some examples, the communication link manager 940 may cease to communicate with the relay node. In some examples, the communication link manager 940 may cancel an uplink communication with the relay node, or a downlink communication with the relay node, or an uplink communication with a fourth node of the wireless network that is a child to the child node, or a downlink communication with the fourth node, or a combination thereof. In some examples, the communication link manager 940 may receive a downlink transmission, or flush an uplink buffer, or process an uplink transmission, or buffer an uplink transmission, or transmit an acknowledgment in response to the downlink transmission, or process a broadcast transmission, or signal a reference signal, or a combination of these.

In some examples, the communication link manager 940 may receive the indication in a MIB, a SIB, a RMSI signal, an OSI signal, a MAC CE, RRC signaling, an upper-layer signaling, or a combination thereof.

The child node manager 925 may transmit, to the child node, an indication that the relay node is operating according to a transition state responsive to a timing alignment timer having expired for a first communication link between the relay node and a parent node of the relay node. In some examples, the child node manager 925 may modify a configuration of a second communication link between the child node and the relay node based on the timing alignment timer having expired.

The uplink synchronization manager 930 may identify a RLF based on the expiration of the transition timer. In some examples, the uplink synchronization manager 930 may transmit, to a third node of the wireless communications network, an indication that the relay node has lost uplink synchronization for the communication link between the relay node and the parent node of the wireless communications network, an indication that for the third node of the wireless communications network to find another serving cell, and indication of services provided by the relay node in the transition state, or some combination thereof.

In some examples, the uplink synchronization manager 930 may identify whether a timing alignment timer for a third communication link between a second parent node of the wireless communications network and the relay node is active or has expired, where setting the transition timer for the second communication link is based on the timing alignment timer for the first communication link having expired regardless of whether the timing alignment timer for the third communication link is active or has expired.

In some examples, the uplink synchronization manager 930 may identify that a timing alignment timer for a third communication link between a second parent node of the wireless communications network and the relay node has expired, where setting the transition timer for the second communication link is based on the timing alignment timer for the first communication link having expired and the timing alignment timer for the third communication link having expired.

In some examples, the uplink synchronization manager 930 may identify that all of a set of timing alignment timers for wireless communication links between the relay node and a set of parent nodes have expired, where the parent node is one of the set of parent nodes, and where setting the transition timer for the second communication link is based on identifying that all of the set of timing alignment timers have expired.

In some examples, the uplink synchronization manager 930 may identify that at least one of a set of timing alignment timers for wireless communication links between the relay node and a set of parent nodes have expired, where the parent node is one of the set of parent nodes, and where setting the transition timer for the second communication link is based on identifying that the at least one of the set of timing alignment timers have expired. In some examples, the uplink synchronization manager 930 may identify, by the control node, that the timing alignment timer for the first communication link has expired. In some cases, the second parent node includes a second node of the wireless communications network and the parent node includes a primary node of the wireless communications network.

Figure 10:
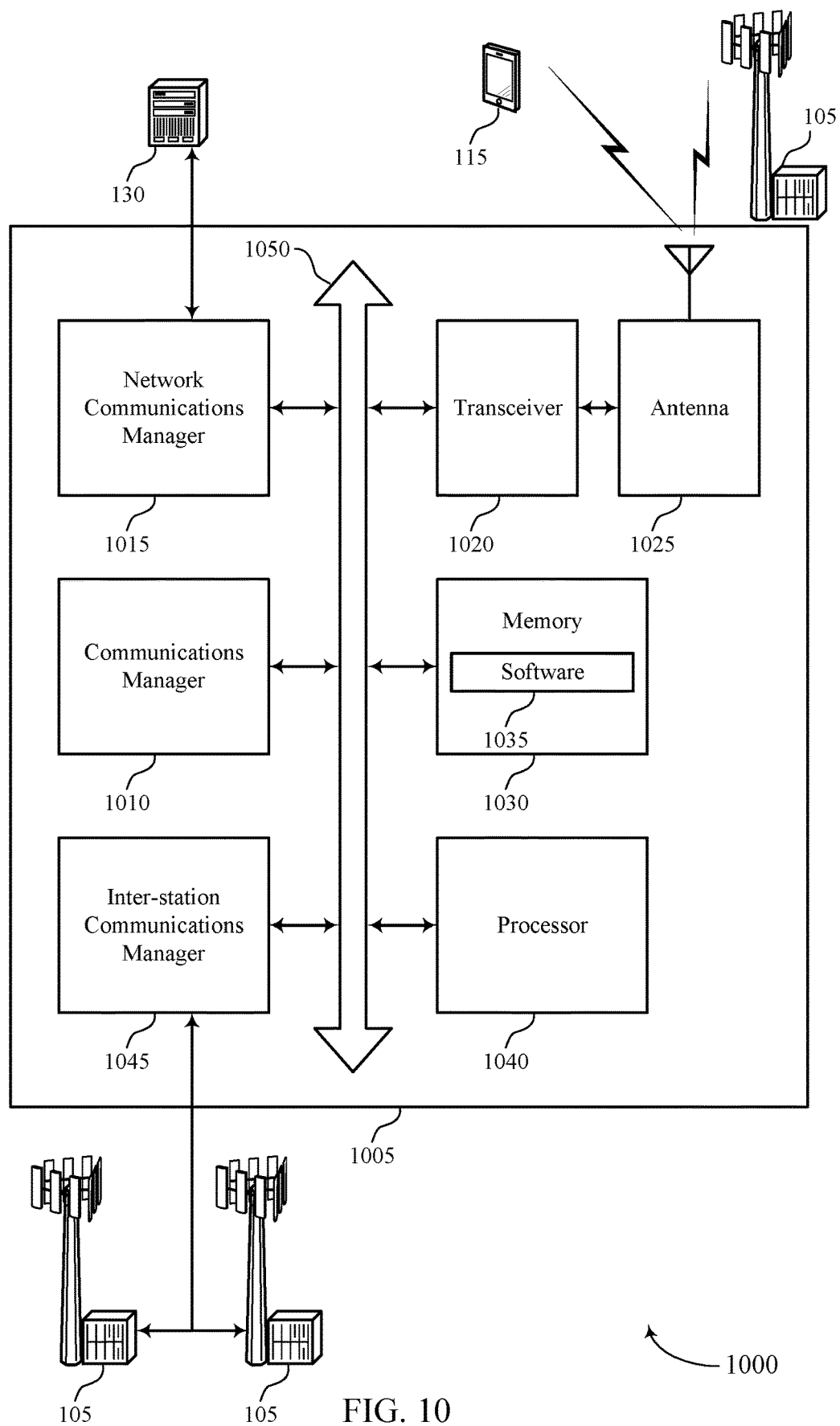
FIG. 10 shows a diagram of a system including a device that supports IAB link management during loss of uplink synchronization in accordance with aspects of the present disclosure.

FIG. 10 shows a diagram of a system 1000 including a device 1005 that supports IAB link management during loss of uplink synchronization in accordance with aspects of the present disclosure. The device 1005 may be an example of or include the components of device 705, device 805, a base station 105, an IAB donor node (e.g., IAB donor node 310 or IAB donor node 410), or an IAB node (e.g., IAB node 315 or IAB node 415) as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in coupled and in electronic communication via one or more buses (e.g., bus 1050).

The communications manager 1010 may identify that a timing alignment timer for a first communication link between a parent node of the wireless communications network and the relay node has expired, set, responsive to identifying that the timing alignment timer has expired, a transition timer for a second communication link between the relay node and at least one child node of the wireless communications network, where an expiration of the transition timer indicates that the relay has lost timing synchronization with the at least one child node on the second communication link, and operate the relay node in a transition state while the transition timer is active. The communications manager 1010 may also receive, from a relay node of the wireless communications network, an indication that the relay node is operating according to a transition state responsive to a timing alignment timer having expired for a first communication link between the relay node and a parent node of the relay node and modify a configuration of a second communication link between the child node and the relay node based on the received indication. The communications manager 1010 may also identify a state of a relay node of the wireless communications network, where a parent node communicates with the relay node using a first communication link, determine a configuration for a transition timer of the relay node based on the identified state of the relay node, where the transition timer is for a second communication link between the relay node and at least one child node of the relay node, and the transition timer is set by the relay node responsive to an identification that a timing alignment timer for the first communication link has expired, and transmit, to the relay node, an indication of the determined configuration for the transition timer of the relay node.

The communications manager 1010 may perform the described functions, operations, techniques, etc. to reduce service interruption, signaling delay activity, unnecessary buffer flushing or RLF determinations, etc. For example, the communications manager 1010 may set a transition timer and operate the relay node in a transition state while the transition timer is active to allow for uplink synchronization continuity or re-establishment with antecedent devices as a means to regain access to network resources (e.g., in cases where a next TA value is received while the relay node is operating in the DU transition state, prior to expiration of the transition timer, the relay node may reestablish uplink synchronization). Even in cases where the uplink synchronization is not reestablished before the expiration of the transition timer, the DU transition state managed by communications manager 1010 may allow for efficient handling child node offloading (e.g., via temporary continued service, notification of DU transition state operation/loss of uplink synchronization, etc.). In accordance with other aspects, communications manager 1010 may support determination and communication of information for implementation of the techniques described herein (e.g., which may allow for other devices of a wireless communications system to set transition timers, operate in DU transition states, etc., which may provide for more efficient utilization of resources and reduce service interruptions throughout the wireless communications system).

The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code or software 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some cases, a memory controller may be integrated into processor 1040. The processor 1040 may be configured to execute computer-readable instructions stored in a memory (e.g., the memory 1030) to cause the device 1005 to perform various functions (e.g., functions or tasks supporting IAB link management during loss of uplink synchronization).

The inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communication network technology to provide communication between base stations 105.

The software 1035 may include instructions to implement aspects of the present disclosure, including instructions to support wireless communications. The software 1035 may be stored in a non-transitory computer-readable medium such as system memory or other type of memory. In some cases, the software 1035 may not be directly executable by the processor 1040 but may cause a computer (e.g., when compiled and executed) to perform functions described herein.

Figure 11:
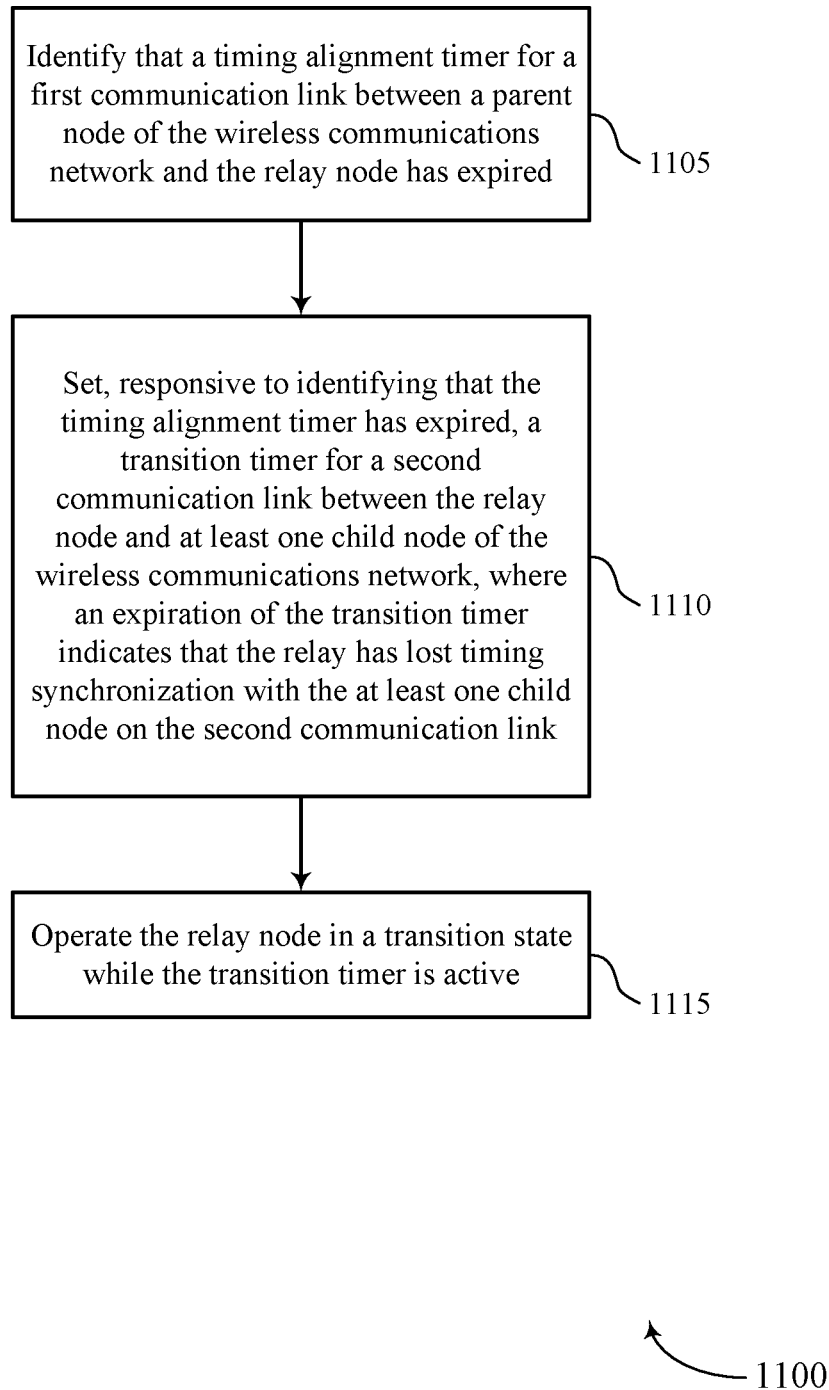
FIGS. 11 through 14 show flowcharts illustrating methods that support IAB link management during loss of uplink synchronization in accordance with aspects of the present disclosure.

FIG. 11 shows a flowchart illustrating a method 1100 that supports IAB link management during loss of uplink synchronization in accordance with aspects of the present disclosure. The operations of method 1100 may be implemented by a base station 105 or its components as described herein. For example, the operations of method 1100 may be performed by a communications manager as described with reference to FIGS. 7 through 10. In some examples, a base station may execute a set of instructions to control the functional elements of the base station to perform the functions described below. Additionally or alternatively, a base station may perform aspects of the functions described below using special-purpose hardware.

At 1105, the base station may identify that a timing alignment timer for a first communication link between a parent node of the wireless communications network and the relay node has expired. The operations of 1105 may be performed according to the methods described herein. In some examples, aspects of the operations of 1105 may be performed by a timing alignment timer manager as described with reference to FIGS. 7 through 10.

At 1110, the base station may set, responsive to identifying that the timing alignment timer has expired, a transition timer for a second communication link between the relay node and at least one child node of the wireless communications network, where an expiration of the transition timer indicates that the relay has lost timing synchronization with the at least one child node on the second communication link. The operations of 1110 may be performed according to the methods described herein. In some examples, aspects of the operations of 1110 may be performed by a transition timer manager as described with reference to FIGS. 7 through 10.

At 1115, the base station may operate the relay node in a transition state while the transition timer is active. The operations of 1115 may be performed according to the methods described herein. In some examples, aspects of the operations of 1115 may be performed by a transition state manager as described with reference to FIGS. 7 through 10.

Figure 12:
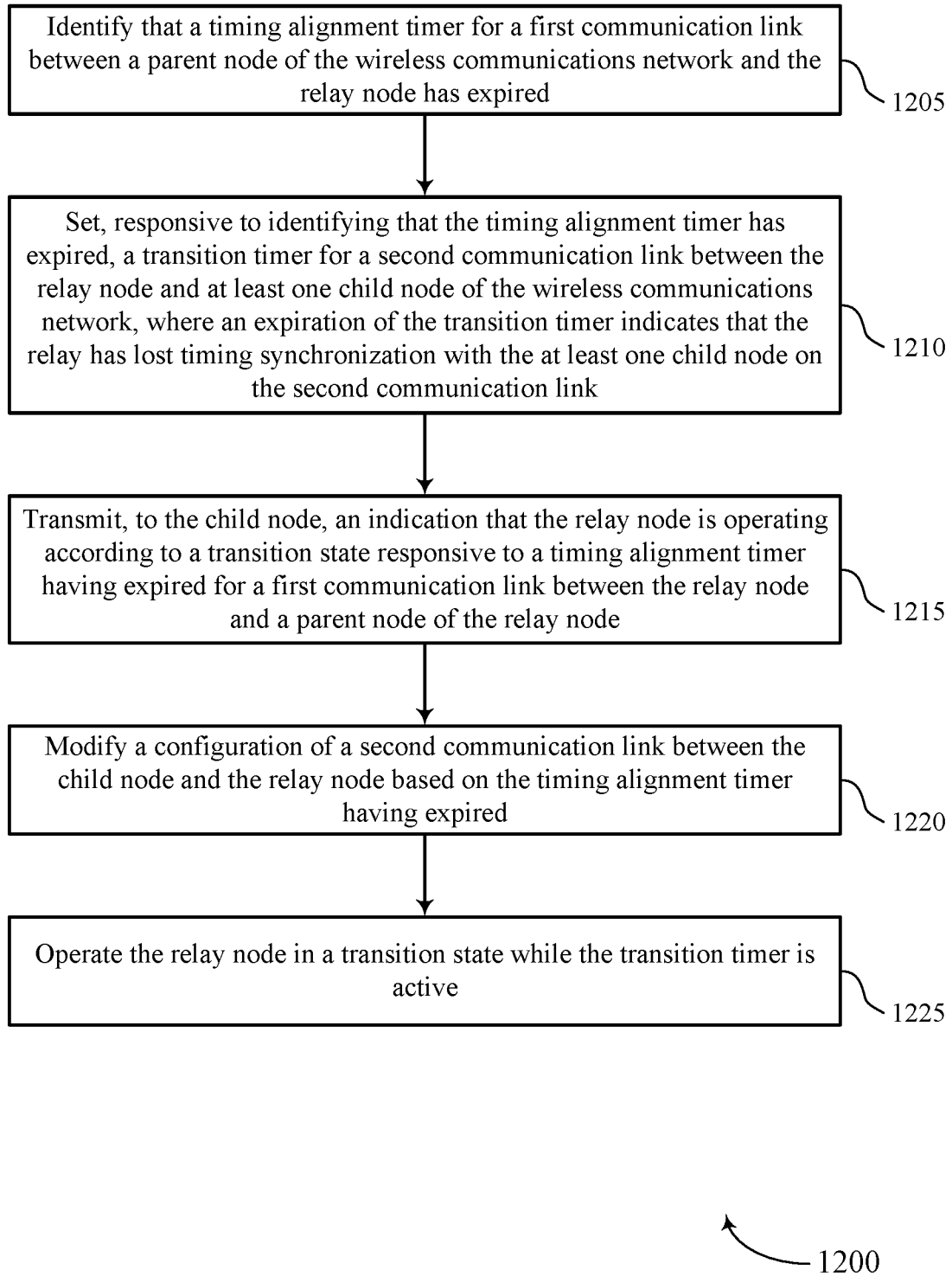

FIG. 12 shows a flowchart illustrating a method 1200 that supports IAB link management during loss of uplink synchronization in accordance with aspects of the present disclosure. The operations of method 1200 may be implemented by a base station 105 or its components as described herein. For example, the operations of method 1200 may be performed by a communications manager as described with reference to FIGS. 7 through 10. In some examples, a base station may execute a set of instructions to control the functional elements of the base station to perform the functions described below. Additionally or alternatively, a base station may perform aspects of the functions described below using special-purpose hardware.

At 1205, the base station may identify that a timing alignment timer for a first communication link between a parent node of the wireless communications network and the relay node has expired. The operations of 1205 may be performed according to the methods described herein. In some examples, aspects of the operations of 1205 may be performed by a timing alignment timer manager as described with reference to FIGS. 7 through 10.

At 1210, the base station may set, responsive to identifying that the timing alignment timer has expired, a transition timer for a second communication link between the relay node and at least one child node of the wireless communications network, where an expiration of the transition timer indicates that the relay has lost timing synchronization with the at least one child node on the second communication link. The operations of 1210 may be performed according to the methods described herein. In some examples, aspects of the operations of 1210 may be performed by a transition timer manager as described with reference to FIGS. 7 through 10.

At 1215, the base station may transmit, to the child node, an indication that the relay node is operating according to a transition state responsive to a timing alignment timer having expired for a first communication link between the relay node and a parent node of the relay node. The operations of 1215 may be performed according to the methods described herein. In some examples, aspects of the operations of 1215 may be performed by a child node manager as described with reference to FIGS. 7 through 10.

At 1220, the base station may modify a configuration of a second communication link between the child node and the relay node based on the timing alignment timer having expired. The operations of 1220 may be performed according to the methods described herein. In some examples, aspects of the operations of 1220 may be performed by a child node manager as described with reference to FIGS. 7 through 10.

At 1225, the base station may operate the relay node in a transition state while the transition timer is active. The operations of 1225 may be performed according to the methods described herein. In some examples, aspects of the operations of 1225 may be performed by a transition state manager as described with reference to FIGS. 7 through 10.

Figure 13:
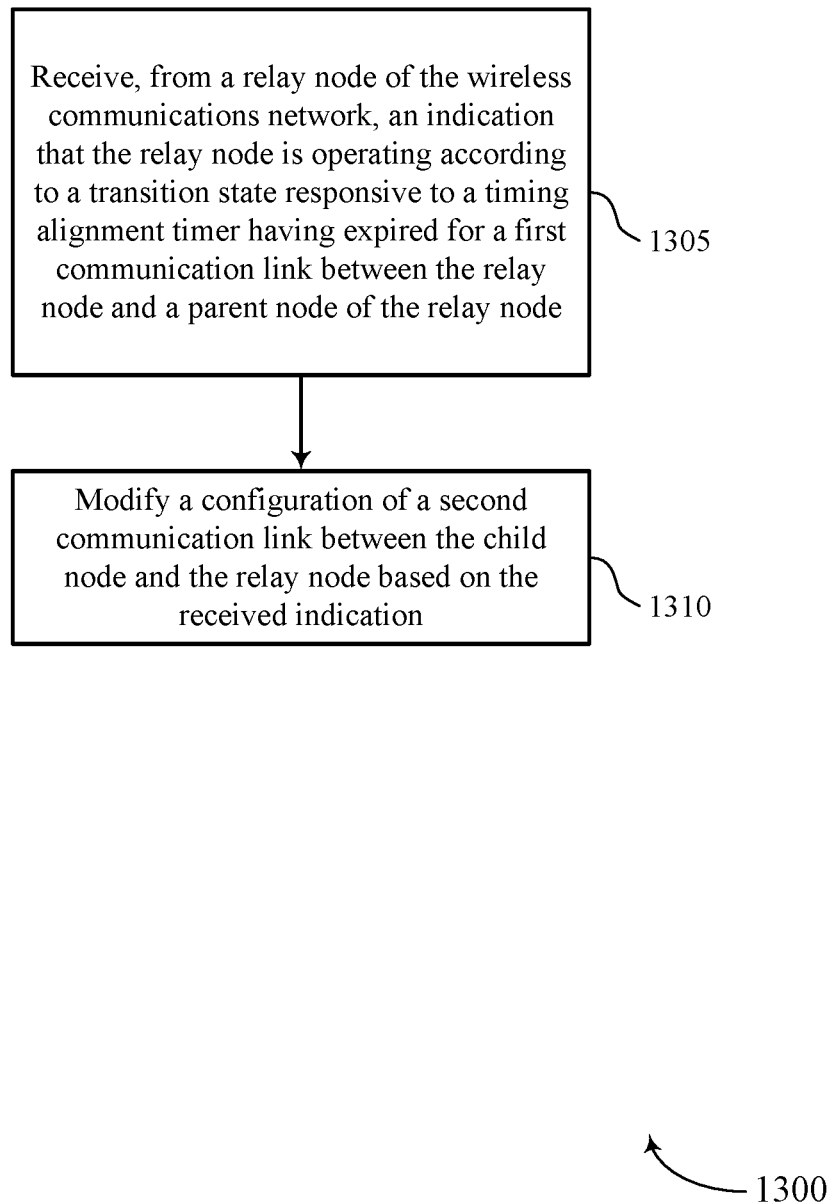

FIG. 13 shows a flowchart illustrating a method 1300 that supports IAB link management during loss of uplink synchronization in accordance with aspects of the present disclosure. The operations of method 1300 may be implemented by a base station 105 or its components as described herein. For example, the operations of method 1300 may be performed by a communications manager as described with reference to FIGS. 7 through 10. In some examples, a base station may execute a set of instructions to control the functional elements of the base station to perform the functions described below. Additionally or alternatively, a base station may perform aspects of the functions described below using special-purpose hardware.

At 1305, the base station may receive, from a relay node of the wireless communications network, an indication that the relay node is operating according to a transition state responsive to a timing alignment timer having expired for a first communication link between the relay node and a parent node of the relay node. The operations of 1305 may be performed according to the methods described herein. In some examples, aspects of the operations of 1305 may be performed by a transition state manager as described with reference to FIGS. 7 through 10.

At 1310, the base station may modify a configuration of a second communication link between the child node and the relay node based on the received indication. The operations of 1310 may be performed according to the methods described herein. In some examples, aspects of the operations of 1310 may be performed by a communication link manager as described with reference to FIGS. 7 through 10.

Figure 14:
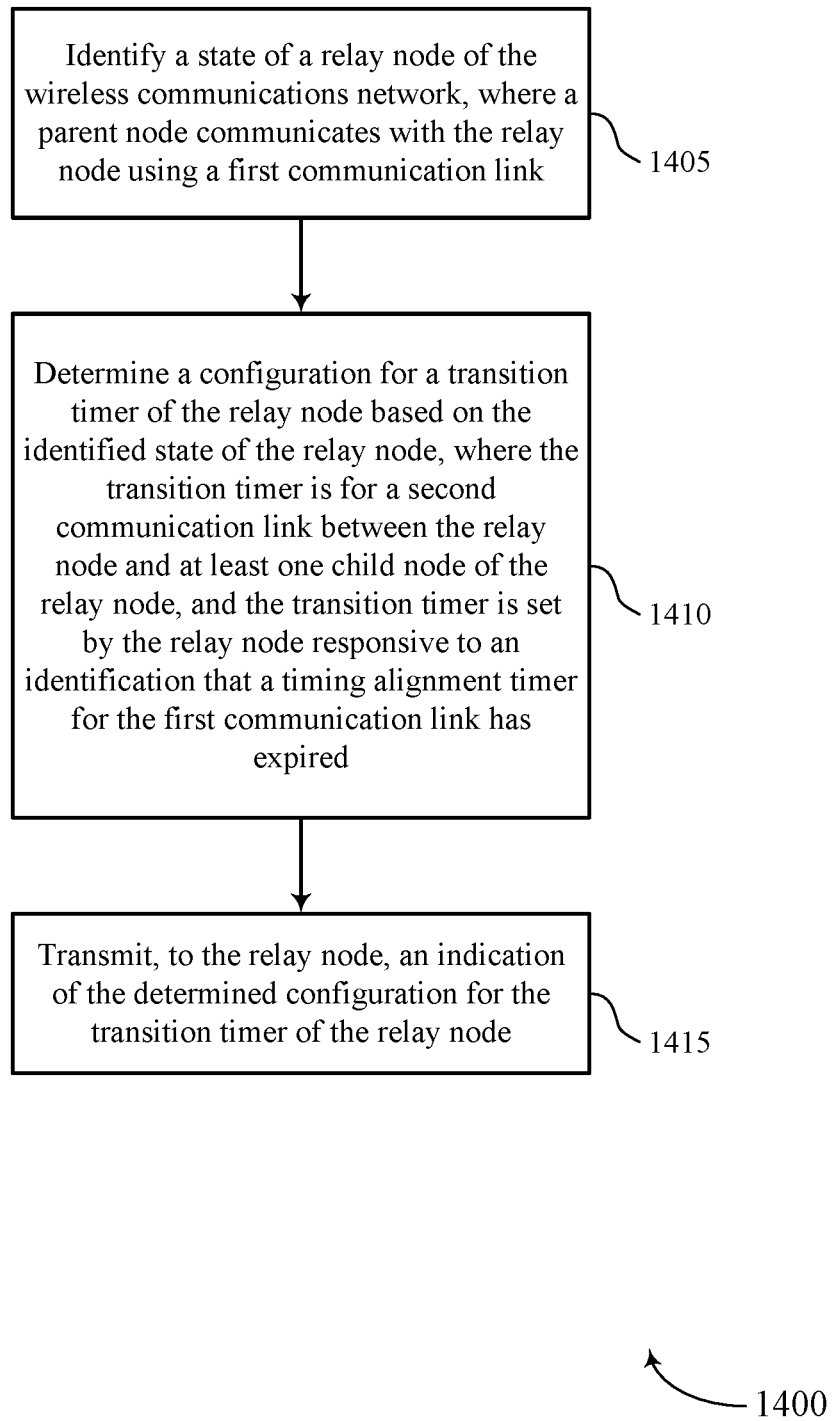

FIG. 14 shows a flowchart illustrating a method 1400 that supports IAB link management during loss of uplink synchronization in accordance with aspects of the present disclosure. The operations of method 1400 may be implemented by a base station 105 or its components as described herein. For example, the operations of method 1400 may be performed by a communications manager as described with reference to FIGS. 7 through 10. In some examples, a base station may execute a set of instructions to control the functional elements of the base station to perform the functions described below. Additionally or alternatively, a base station may perform aspects of the functions described below using special-purpose hardware.

At 1405, the base station may identify a state of a relay node of the wireless communications network, where a parent node communicates with the relay node using a first communication link. The operations of 1405 may be performed according to the methods described herein. In some examples, aspects of the operations of 1405 may be performed by a relay node state manager as described with reference to FIGS. 7 through 10.

At 1410, the base station may determine a configuration for a transition timer of the relay node based on the identified state of the relay node, where the transition timer is for a second communication link between the relay node and at least one child node of the relay node, and the transition timer is set by the relay node responsive to an identification that a timing alignment timer for the first communication link has expired. The operations of 1410 may be performed according to the methods described herein. In some examples, aspects of the operations of 1410 may be performed by a transition timer manager as described with reference to FIGS. 7 through 10.

At 1415, the base station may transmit, to the relay node, an indication of the determined configuration for the transition timer of the relay node. The operations of 1415 may be performed according to the methods described herein. In some examples, aspects of the operations of 1415 may be performed by a transition timer manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a relay node of a wireless communications network, comprising:
identifying that a timing alignment timer for a first communication link between a parent node of the wireless communications network and the relay node has expired;
setting, in response to the timing alignment timer having expired, a transition timer for a second communication link between the relay node and at least one child node of the wireless communications network, wherein an expiration of the transition timer indicates that the relay node has lost timing synchronization with the at least one child node on the second communication link; and
operating the relay node in a transition state while the transition timer is active.

2. The method of claim 1, wherein operating the relay node in the transition state while the transition timer is active comprises:
refraining from communicating with the at least one child node using the second communication link when the transition timer is active.

3. The method of claim 1, wherein operating the relay node in the transition state while the transition timer is active comprises:
continuing to communicate with the at least one child node using the second communication link when the transition timer is active.

4. The method of claim 1, wherein operating the relay node in the transition state while the transition timer is active comprises:
continuing to communicate with the at least one child node using the second communication link according to a reduced communication level while the transition timer is active, the reduced communication level reduced from a first communication level of the relay node before identifying that the timing alignment timer has expired.

5. The method of claim 4, wherein continuing to communicate with the at least one child node according to the reduced communication level comprises:
transmitting downlink traffic buffered at the relay node to the at least one child node of the wireless communications network.

6. The method of claim 4, wherein continuing to communicate with the at least one child node according to the reduced communication level comprises:
refraining from transmitting downlink traffic buffered at the relay node to the at least one child node of the wireless communications network; and
flushing at least one buffer for the downlink traffic for the at least one child node of the wireless communications network.

7. The method of claim 4, wherein continuing to communicate with the at least one child node according to the reduced communication level comprises:
refraining from transmitting downlink traffic buffered at the relay node to the at least one child node of the wireless communications network; and
maintaining the downlink traffic buffered for the at least one child node of the wireless communications network.

8. The method of claim 4, wherein continuing to communicate with the at least one child node according to the reduced communication level comprises:
refraining from receiving scheduled uplink transmissions from the at least one child node of the wireless communications network.

9. The method of claim 4, wherein continuing to communicate with the at least one child node according to the reduced communication level comprises:
receiving scheduled uplink transmissions from the at least one child node of the wireless communications network;
buffering the received scheduled uplink transmissions; and
transmitting one or more acknowledgements to the at least one child node of the wireless communications network based at least in part on the received scheduled uplink transmissions.

10. The method of claim 4, wherein continuing to communicate with the at least one child node according to the reduced communication level comprises:
refraining from scheduling uplink transmissions for the at least one child node of the wireless communications network.

11. The method of claim 4, wherein continuing to communicate with the at least one child node according to the reduced communication level comprises:
transmitting a broadcast signal, or a reference signal, or a combination thereof.

12. The method of claim 1, further comprising:
transmitting, to the at least one child node, an indication that the relay node is operating according to the transition state responsive to the timing alignment timer having expired for the first communication link between the relay node and the parent node of the relay node; and
modifying a configuration of the second communication link between the at least one child node and the relay node based at least in part on the timing alignment timer having expired.

13. The method of claim 1, further comprising:
identifying a radio link failure (RLF) based at least in part on the expiration of the transition timer.

14. The method of claim 1, further comprising:
identifying a configuration for the transition timer of the relay node based at least in part on the expiration of the timing alignment timer.

15. The method of claim 14, further comprising:
receiving the configuration for the transition timer of the relay node from the parent node of the wireless communications network, a central unit (CU) of a third node of the wireless communications network, or both.

16. The method of claim 15, further comprising:
transmitting an indication of a current state of the relay node to the parent node of the wireless communications network, the CU of the third node of the wireless communications network, or both, wherein the configuration for the transition timer of the relay node is based at least in part on the current state.

17. The method of claim 14, wherein the configuration for the transition timer of the relay node is based at least in part on a topology state of the relay node, a mobility state of the relay node, a scheduling state of the relay node, a configuration of a mobile terminal (MT) of the relay node, or some combination thereof.

18. The method of claim 17, wherein the configuration for the transition timer is based at least in part on the timing alignment timer, or a random access channel (RACH) configuration of the MT, or a combination thereof.

19. The method of claim 14, further comprising:
buffering a downlink transmission; or
flushing a downlink buffer; or
scheduling an uplink transmission; or
processing the uplink transmission; or
buffering a second uplink transmission; or
transmitting an acknowledgment in response to the downlink transmission; or
signaling a broadcast transmission; or
signaling a reference signal; or
a combination thereof.

20. The method of claim 1, further comprising:
transmitting, to a third node of the wireless communications network, an indication that the relay node has lost uplink synchronization for the first communication link between the relay node and the parent node of the wireless communications network, an indication for the third node of the wireless communications network to find another serving cell, and an indication of services provided by the relay node in the transition state, or some combination thereof.

21. The method of claim 1, further comprising:
identifying whether a timing alignment timer for a third communication link between a second parent node of the wireless communications network and the relay node is active or has expired, wherein setting the transition timer for the second communication link is based at least in part on the timing alignment timer for the first communication link having expired regardless of whether the timing alignment timer for the third communication link is active or has expired.

22. The method of claim 1, further comprising:
identifying that a timing alignment timer for a third communication link between a second parent node of the wireless communications network and the relay node has expired, wherein setting the transition timer for the second communication link is based at least in part on the timing alignment timer for the first communication link having expired and the timing alignment timer for the third communication link having expired.

23. A method for wireless communication at a child node of a wireless communications network, comprising:
receiving, from a relay node of the wireless communications network, an indication that the relay node is operating according to a transition state that is associated with a transition timer set in response to a timing alignment timer having expired for a first communication link between the relay node and a parent node of the relay node; and
modifying a configuration of a second communication link between the child node and the relay node based at least in part on the received indication.

24. The method of claim 23, wherein modifying the configuration of the second communication link comprises:
searching for a new serving cell in response to the received indication; and
ceasing to communicate with the relay node.

25. The method of claim 23, wherein modifying the configuration of the second communication link comprises:
canceling an uplink communication with the relay node, or a downlink communication with the relay node, or an uplink communication with a fourth node of the wireless communications network that is a child to the child node, or a downlink communication with the fourth node, or a combination thereof.

26. The method of claim 23, wherein modifying the configuration of the second communication link comprises:
receiving a downlink transmission; or
flushing an uplink buffer; or
processing an uplink transmission; or
buffering a second uplink transmission; or
transmitting an acknowledgment in response to the downlink transmission; or
processing a broadcast transmission; or
signaling a reference signal; or
a combination thereof.

27. A method for wireless communication at a control node of a wireless communications network, comprising:
identifying a state of a relay node of the wireless communications network, wherein a parent node communicates with the relay node using a first communication link;
determining a configuration for a transition timer of the relay node based at least in part on the identified state of the relay node, wherein the transition timer is for a second communication link between the relay node and at least one child node of the relay node, and the transition timer is set by the relay node in response to a timing alignment timer for the first communication link having expired; and
transmitting, to the relay node, an indication of the determined configuration for the transition timer of the relay node.

28. The method of claim 27, wherein the state of the relay node comprises a topological state, or a mobility state, or a scheduling state, or a combination thereof.

29. The method of claim 27, wherein transmitting the indication of the determined configuration comprises:
identifying, by the control node, that the timing alignment timer for the first communication link has expired; and
transmitting the indication of the determined configuration based at least in part on the identification that by the control node that the timing alignment timer has expired.

30. An apparatus for wireless communication at a relay node of a wireless communications network, comprising: a processor, memory coupled with the processor; and instructions stored in the memory and executable by the processor to cause the apparatus to:
identify that a timing alignment timer for a first communication link between a parent node of the wireless communications network and the relay node has expired;
set, in response to the timing alignment timer having expired, a transition timer for a second communication link between the relay node and at least one child node of the wireless communications network, wherein an expiration of the transition timer indicates that the relay node has lost timing synchronization with the at least one child node on the second communication link; and
operate the relay node in a transition state while the transition timer is active.

* * * * *